(12) United States Patent
Tanaka

(10) Patent No.: US 10,742,876 B2
(45) Date of Patent: Aug. 11, 2020

(54) IMAGING DEVICE, IMAGING METHOD, AND IMAGING PROGRAM

(71) Applicant: FUJIFILM Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/411,711

(22) Filed: May 14, 2019

(65) Prior Publication Data
US 2019/0273861 A1  Sep. 5, 2019

Related U.S. Application Data

(63) Continuation of application No. PCT/JP2017/037247, filed on Oct. 13, 2017.

(30) Foreign Application Priority Data

Nov. 14, 2016 (JP) ................................. 2016-221762

(51) Int. Cl.
*H04N 5/232* (2006.01)
*G06T 7/20* (2017.01)
(Continued)

(52) U.S. Cl.
CPC .......... *H04N 5/23229* (2013.01); *G06T 7/20* (2013.01); *H04N 5/225* (2013.01); *H04N 5/232* (2013.01);
(Continued)

(58) Field of Classification Search
CPC .......... G06T 7/20; H04N 5/225; H04N 5/232; H04N 5/232127; H04N 5/23219;
(Continued)

(56) References Cited

U.S. PATENT DOCUMENTS

| 8,411,157 B2* | 4/2013 | Gomi ................. H04N 5/23245 348/220.1 |
| 2006/0215040 A1* | 9/2006 | Sugawara .......... H04N 5/23212 348/220.1 |

(Continued)

FOREIGN PATENT DOCUMENTS

| JP | 2006-5596 A | 1/2006 |
| JP | 2010-206769 A | 9/2010 |

(Continued)

OTHER PUBLICATIONS

International Preliminary Report on Patentability and Written Opinion of the International Searching Authority (forms PCT/IB/326, PCT/IB/373 and PCT/ISA/237), dated May 23, 2019, for corresponding International Application No. PCT/JP2017/037247, with an English translation of the Written Opinion.

(Continued)

*Primary Examiner* — Amy R Hsu
(74) *Attorney, Agent, or Firm* — Birch, Stewart, Kolasch & Birch, LLP

(57) ABSTRACT

An imaging device includes: an imaging element including a sensor unit provided with a light reception surface on which a plurality of pixel rows including a plurality of pixels arranged in a row direction are arranged in a column direction orthogonal to the row direction, a storage unit that stores imaging signals read out from all of the pixels included in the plurality of pixel rows, a first output terminal that outputs the imaging signal stored in the storage unit, and a second output terminal that outputs the imaging signal stored in the storage unit; an imaging control unit as defined herein; an output control unit that performs a first output control and a second output control as defined herein; a first image processing unit as defined herein; and a second image processing unit as defined herein.

27 Claims, 16 Drawing Sheets

(51) Int. Cl.
  *H04N 5/265* (2006.01)
  *H04N 5/378* (2011.01)
  *H04N 5/341* (2011.01)
  *H04N 5/225* (2006.01)
(52) U.S. Cl.
  CPC ..... *H04N 5/23219* (2013.01); *H04N 5/23241* (2013.01); *H04N 5/23293* (2013.01); *H04N 5/232127* (2018.08); *H04N 5/265* (2013.01); *H04N 5/341* (2013.01); *H04N 5/378* (2013.01)
(58) Field of Classification Search
  CPC ........... H04N 5/23229; H04N 5/23241; H04N 5/23245; H04N 5/23293; H04N 5/265; H04N 5/341; H04N 5/378
  See application file for complete search history.

(56) References Cited

U.S. PATENT DOCUMENTS

| | | | |
|---|---|---|---|
| 2008/0049133 A1* | 2/2008 | Bock | H04N 5/243 348/317 |
| 2008/0180547 A1* | 7/2008 | Hirose | H04N 5/243 348/229.1 |
| 2009/0190832 A1* | 7/2009 | Miyakoshi | H04N 5/217 382/173 |
| 2010/0194922 A1* | 8/2010 | Honda | H04N 5/23245 348/231.99 |
| 2012/0182455 A1* | 7/2012 | Gomi | H04N 5/23245 348/311 |
| 2014/0308018 A1 | 10/2014 | Ise | |
| 2019/0058831 A1* | 2/2019 | Meng | H04N 5/23245 |

FOREIGN PATENT DOCUMENTS

| | | |
|---|---|---|
| JP | 2012-23663 A | 2/2012 |
| JP | 2012-151596 A | 8/2012 |
| JP | 2014-178603 A | 9/2014 |
| JP | 2014-207503 A | 10/2014 |
| JP | 2016-136660 A | 7/2016 |

OTHER PUBLICATIONS

International Search Report (form PCT/ISA/210), dated Dec. 26, 2017, for corresponding International Application No. PCT/JP2017/037247, with an English translation.

\* cited by examiner

IMAGING DEVICE, IMAGING METHOD, AND IMAGING PROGRAM

CROSS REFERENCE TO RELATED APPLICATION

This is a continuation of International Application No. PCT/JP2017/037247 filed on Oct. 13, 2017, and claims priority from Japanese Patent Application No. 2016-221762 filed on Nov. 14, 2016, the entire disclosures of which are incorporated herein by reference.

BACKGROUND OF THE INVENTION

1. Field of the Invention

The present invention relates to an imaging device, an imaging method, and a computer readable medium storing an imaging program.

2. Description of the Related Art

In recent years, with high resolution of an imaging element such as a charge coupled device (CCD) image sensor or a complementary metal oxide semiconductor (CMOS) image sensor, a demand for information devices having an imaging function such as an electronic endoscope, a digital still camera, a digital video camera, a tablet terminal, a personal computer, or a mobile phone with a camera typified by a smartphone has been rapidly increased. It should be noted that the information device having the imaging function as described above is referred to as an imaging device.

In such an imaging device, in a case where an imaging mode is set, a live view image is displayed on a display unit. In the display of the live view image, speed is prioritized over resolution. Therefore, in a case where imaging for a live view image display is performed, thinning readout in which a signal is read out from a part of all the pixels of the imaging element is performed.

On the other hand, in a case where imaging for a still image for storage is performed, after signals from all the pixels of the imaging element are read out, the read signals are processed to generate captured image data (refer to JP2012-151596A and JP2006-005596A).

JP2012-151596A describes an imaging device in which an imaging element capable of outputting signals of all the pixels from two output terminals is mounted.

In the imaging device described in JP2012-151596A, all the pixels are divided into fields, signals of the respective fields are sequentially output from the first output terminal, and the captured image data is generated on the basis of the output signals of all the fields.

Also, a signal of an arbitrary field is output from the second output terminal, image data for a live view image display is generated on the basis of the signal of the arbitrary field, and the live view image is displayed on the basis of the image data.

JP2006-005596A discloses an imaging device which temporarily stores captured image signals, which are output from an imaging element by still image capturing, in a memory, divides the captured image signals in a horizontal direction, and performs a signal process for each divided captured image signal to generate captured image data.

Further, the imaging device described in JP2006-005596A generates image data for a live view image display by resizing the captured image signals stored in the memory, and displays a live view image on the basis of the image data.

SUMMARY OF THE INVENTION

With the imaging device described in JP2012-151596A, it is possible to display a post-view image for checking the captured image data and display a live view image which is being captured by the imaging element while the captured image data is being generated.

However, in order to generate the captured image data, the imaging device described in JP2012-151596A needs to wait for output of signals of all the pixels from the imaging element, and thus the time until the generation of the captured image data is completed after the imaging is performed becomes longer.

Similarly, in order to generate the captured image data, the imaging device described in JP2006-005596A needs to wait for output of signals of all the pixels from the imaging element, and thus the time from the imaging to the completion of generation of the captured image data becomes longer.

Further, the imaging device described in JP2006-005596A cannot display a post-view image or a live view image while the captured image data is being generated.

The present invention has been made in view of the above circumstances, and an object of the present invention is to provide an imaging device, an imaging method, and a computer readable medium storing an imaging program which can reduce the time from the imaging for storage to the completion of generation of captured image data for storage, and quickly check the captured image data for storage after the imaging.

An imaging device according to the present invention comprises: an imaging element including a sensor unit provided with a light reception surface on which a plurality of pixel rows including a plurality of pixels arranged in a row direction are arranged in a column direction orthogonal to the row direction, a storage unit that stores imaging signals read out from all the pixels included in the plurality of pixel rows, a first output terminal that outputs the imaging signal stored in the storage unit, and a second output terminal that outputs the imaging signal stored in the storage unit; an imaging control unit that performs a first imaging control of exposing all the pixels, reading out imaging signals from the pixels, and storing the imaging signals in the storage unit; an output control unit that performs a first output control of outputting, among captured image signals composed of the imaging signals that are read out from all the pixels and are stored in the storage unit by the first imaging control, the imaging signals read out from the pixels included in the pixel row that is selected in a case where the plurality of pixel rows are selected one for every N in the column direction, from the first output terminal, the N being a natural number of 2 or more, and a second output control of dividing the captured image signals into M groups including the imaging signals read out from the pixels in each division area that is obtained in a case where the light reception surface is divided in at least one of the row direction or the column direction, sequentially selecting the M groups, and outputting the imaging signals of the selected group from the second output terminal, the M being 2 or more; a first image processing unit that processes the imaging signals output from the first output terminal to generate captured image data for display; and a second image processing unit that processes the imaging signals of the group that are output from the second output terminal to sequentially generate divided image data corresponding to the group, and combines the divided image data corresponding to each of the M groups to generate captured image data for storage.

An imaging method according to the present invention is an imaging method of imaging an object by using an imaging element including a sensor unit provided with a light reception surface on which a plurality of pixel rows including a plurality of pixels arranged in a row direction are arranged in a column direction orthogonal to the row direction, a storage unit that stores imaging signals read out from all the pixels included in the plurality of pixel rows, a first output terminal that outputs the imaging signal stored in the storage unit, and a second output terminal that outputs the imaging signal stored in the storage unit. The imaging method comprises: an imaging control step of performing a first imaging control of exposing all the pixels, reading out imaging signals from the pixels, and storing the imaging signals in the storage unit; an output control step of performing a first output control of outputting, among captured image signals composed of the imaging signals that are read out from all the pixels and are stored in the storage unit by the first imaging control, the imaging signals read out from the pixels included in the pixel row that is selected in a case where the plurality of pixel rows are selected one for every N in the column direction, from the first output terminal, the N being a natural number of 2 or more, and a second output control of dividing the captured image signals into M groups including the imaging signals read out from the pixels in each division area that is obtained in a case where the light reception surface is divided in at least one of the row direction or the column direction, sequentially selecting the M groups, and outputting the imaging signals of the selected group from the second output terminal, the M being 2 or more; a first image processing step of processing the imaging signals output from the first output terminal to generate captured image data for display; and a second image processing step of sequentially processing the imaging signals of the group that are output from the second output terminal to generate divided image data corresponding to the group, and combining the divided image data corresponding to each of the M groups to generate captured image data for storage.

An imaging program according to the present invention is an imaging program for imaging an object by using an imaging element including a sensor unit provided with a light reception surface on which a plurality of pixel rows including a plurality of pixels arranged in a row direction are arranged in a column direction orthogonal to the row direction, a storage unit that stores imaging signals read out from all the pixels included in the plurality of pixel rows, a first output terminal that outputs the imaging signal stored in the storage unit, and a second output terminal that outputs the imaging signal stored in the storage unit. The imaging program causes a computer to execute: an imaging control step of performing a first imaging control of exposing all the pixels, reading out imaging signals from the pixels, and storing the imaging signals in the storage unit; an output control step of performing a first output control of outputting, among captured image signals composed of the imaging signals that are read out from all the pixels and are stored in the storage unit by the first imaging control, the imaging signals read out from the pixels included in the pixel row that is selected in a case where the plurality of pixel rows are selected one for every N in the column direction, from the first output terminal, the N being a natural number of 2 or more, and a second output control of dividing the captured image signals into M groups including the imaging signals read out from the pixels in each division area that is obtained in a case where the light reception surface is divided in at least one of the row direction or the column direction, sequentially selecting the M groups, and outputting the imaging signals of the selected group from the second output terminal, the M being 2 or more; a first image processing step of processing the imaging signals output from the first output terminal to generate captured image data for display; and a second image processing step of sequentially processing the imaging signals of the group that are output from the second output terminal to generate divided image data corresponding to the group, and combining the divided image data corresponding to each of the M groups to generate captured image data for storage.

According to the present invention, it is possible to provide an imaging device, an imaging method, and an imaging program which can reduce the time from the imaging for storage to the completion of generation of captured image data for storage, and quickly check the captured image data for storage after the imaging.

DESCRIPTION OF THE PREFERRED EMBODIMENTS

Hereinafter, embodiments of the present invention will be described with reference to the drawings.

Figure 1:
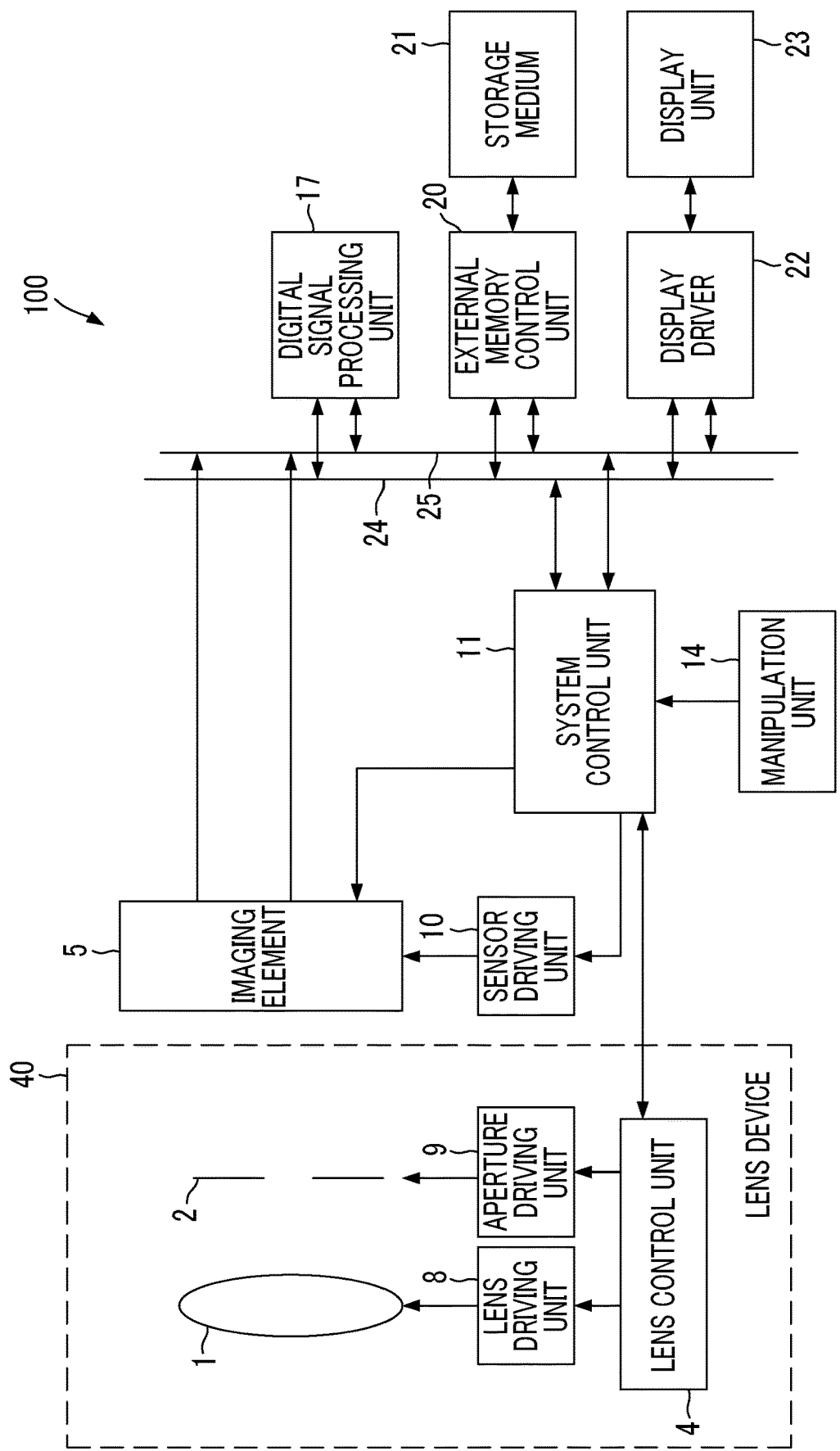
FIG. 1 is a diagram illustrating a schematic configuration of a digital camera 100 as an imaging device which is an embodiment of the present invention.

FIG. 1 is a diagram illustrating a schematic configuration of a digital camera 100 as an imaging device which is an embodiment of the present invention.

The digital camera 100 illustrated in FIG. 1 comprises a lens device 40 having an imaging lens 1, an aperture 2, a lens control unit 4, a lens driving unit 8, and an aperture driving unit 9.

In the embodiment, the lens device 40 is described as being attachable to and detachable from a main body of the digital camera 100, but may be integrated with the main body of the digital camera 100.

The imaging lens 1 and the aperture 2 constitute an imaging optical system, and the imaging optical system includes a focus lens.

The focus lens is a lens for adjusting a focal point of the imaging optical system, and is composed of a single lens or a plurality of lenses. The focal point is adjusted by the focus lens being moved in a direction of an optical axis of the imaging optical system.

As the focus lens, a liquid lens which can change a focal position by variably controlling the curved surface of the lens may be used.

The lens control unit 4 of the lens device 40 is configured to be capable of communicating with a system control unit 11 in the main body of the digital camera 100 by cable or wirelessly.

The lens control unit 4 drives a focus lens included in the imaging lens 1 via the lens driving unit 8 or drives the aperture 2 via the aperture driving unit 9 according to a command from the system control unit 11.

The main body of the digital camera 100 comprises a MOS type imaging element 5 such as a CMOS image sensor for imaging an object through the imaging optical system, a sensor driving unit 10 that drives the imaging element 5, a system control unit 11 that totally controls the entire electric control system of the digital camera 100, a manipulation unit 14, a digital signal processing unit 17, an external memory control unit 20 to which a detachable storage medium 21 is connected, a display unit 23 such as an organic electro luminescence (EL) display or a liquid crystal display (LCD), and a display driver 22 that drives the display unit 23.

The system control unit 11 includes various processors, a random access memory (RAM), and a read only memory (ROM), and totally controls the entire digital camera 100.

The system control unit 11 implements each function, which will be described below, by causing the processor to execute a program including an imaging program stored in the built-in ROM.

The digital signal processing unit 17 includes various processors, a RAM, and a ROM, and performs various processes by the processors executing the program including the imaging program stored in the ROM.

The various processors include a central processing unit (CPU) that is a general-purpose processor executing a program to perform various processes, a programmable logic device (PLD) that is a processor of which a circuit configuration can be changed after manufacture, such as a field programmable gate array (FPGA), or a dedicated electric circuit that is a processor having a circuit configuration designed to be dedicated to execute a specific process, such as application specific integrated circuit (ASIC).

More specifically, structures of the various processors are electric circuits in which circuit elements such as semiconductor elements are combined.

The processors of the system control unit 11 and the processors of the digital signal processing unit 17 may be constituted by one of various processors, or may be constituted by a combination of two or more of the same or different types of processors (for example, a combination of a plurality of FPGAs or a combination of a CPU and an FPGA).

The digital signal processing unit 17, the external memory control unit 20, and the display driver 22 are connected to each other via a control bus 24 and a data bus 25, and operate on the basis of a command from the system control unit 11.

Figure 2:
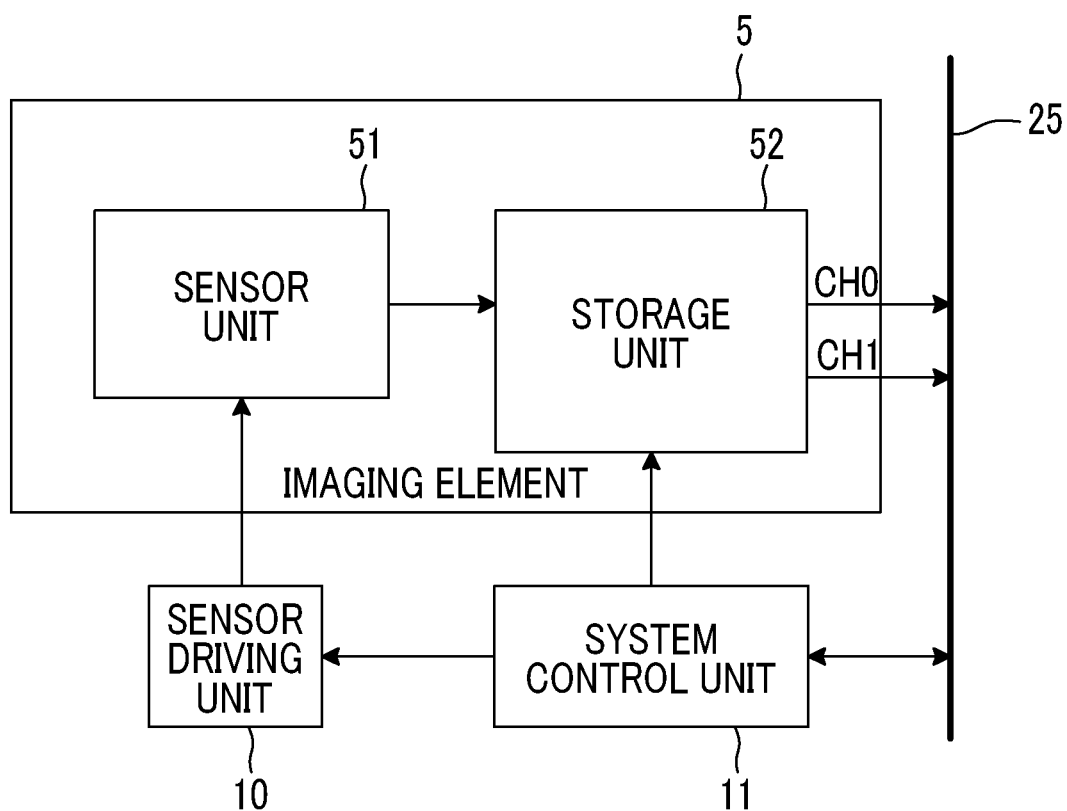
FIG. 2 is a schematic diagram illustrating a schematic configuration of an imaging element 5 mounted on the digital camera 100 illustrated in FIG. 1.

FIG. 2 is a schematic diagram illustrating a schematic configuration of the imaging element 5 mounted on the digital camera 100 illustrated in FIG. 1.

The imaging element 5 comprises a sensor unit 51, and a storage unit 52.

The sensor unit 51 images an object with a plurality of pixels, and outputs imaging signals read out from each pixel by this imaging. The sensor unit 51 is driven by the sensor driving unit 10.

The storage unit 52 stores imaging signals output from the sensor unit 51, and includes a plurality of storage elements such as a capacitor or a flip-flop for storing data, and a control circuit (not illustrated) that controls storage and readout of the data of the plurality of storage elements. The control circuit is controlled by the system control unit 11.

The storage unit 52 may be any unit as long as the unit includes a rewritable storage element, and a semiconductor memory, a ferroelectric memory, or the like can be used as the storage unit 52.

For example, a static random access memory (SRAM), a dynamic random access memory (DRAM), a ferroelectric random access memory (FRAM (registered trademark)), or a flash memory can be used as the storage unit 52.

The storage unit 52 is provided with a first output terminal CH0 and a second output terminal CH1 which output the stored imaging signals to the data bus 25.

The imaging element 5 includes an interface conforming to a standard such as scalable low voltage signaling (SLVS). The imaging signals stored in the storage unit 52 are output to the data bus 25 from the first output terminal CH0 and the second output terminal CH1 by the interface.

Figure 3:
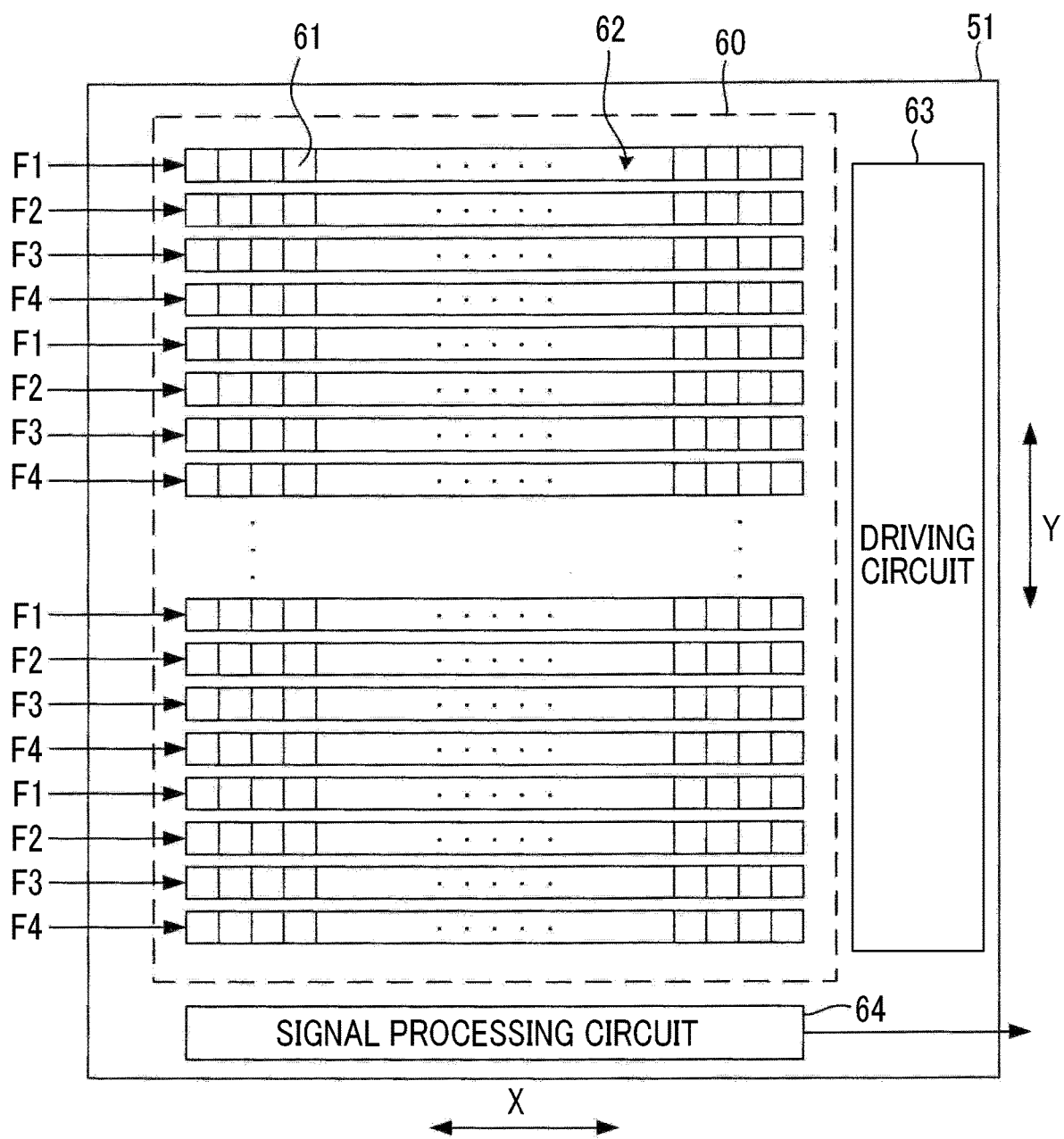
FIG. 3 is a schematic plan diagram illustrating a configuration of a sensor unit 51 of the imaging element 5 illustrated in FIG. 2.

FIG. 3 is a schematic plan diagram illustrating a configuration of the sensor unit 51 of the imaging element 5 illustrated in FIG. 2.

The sensor unit 51 comprises a light reception surface 60 on which a plurality of pixel rows 62 including a plurality of pixels 61 arranged in a row direction X which is one direction are arranged in a column direction Y orthogonal to the row direction X, a driving circuit 63 that drives the pixels 61 arranged on the light reception surface 60, and a signal processing circuit 64 that processes an imaging signal read out from each pixel 61 of the pixel row 62 arranged on the light reception surface 60.

Hereinafter, in FIG. 3, an upward end of the light reception surface 60 in the column direction Y is referred to as an upper end, and a downward end of the light reception surface 60 in the column direction Y is referred to as a lower end.

The pixel 61 includes a photoelectric conversion unit that receives light passing through the imaging optical system of the lens device 40 and generates and accumulates charge according to the amount of received light, and a readout circuit that converts the charge accumulated in the photoelectric conversion unit into a voltage signal and reads the voltage signal to a signal line. A well-known configuration can be adopted for the readout circuit.

The readout circuit includes, for example, a transfer transistor for transferring the charge accumulated in the photoelectric conversion unit to a floating diffusion, a reset transistor for resetting a potential of the floating diffusion, an output transistor that outputs a voltage signal according to the potential of the floating diffusion, and a selection transistor for selectively reading out the voltage signal output from the output transistor to the signal line. It should be noted that the readout circuit may be shared by a plurality of photoelectric conversion units.

An area on the light reception surface 60 on which a (4n+1)-th pixel row 62 from an upper end side of the light reception surface 60 with n being an integer equal to or greater than 0 among all the pixel rows 62 arranged on the light reception surface 60 is disposed is referred to as a field F1.

An area on the light reception surface 60 on which a (4n+2)-th pixel row 62 from an upper end side of the light reception surface 60 among all the pixel rows 62 arranged on the light reception surface 60 is disposed is referred to as a field F2.

An area on the light reception surface 60 on which a (4n+3)-th pixel row 62 from an upper end side of the light reception surface 60 among all the pixel rows 62 arranged on the light reception surface 60 is disposed is referred to as a field F3.

An area on the light reception surface 60 on which a (4n+4)-th pixel row 62 from an upper end side of the light reception surface 60 among all the pixel rows 62 arranged on the light reception surface 60 is disposed is referred to as a field F4.

A phase difference detection pixel is included in the pixels 61 constituting the pixel row 62 in any of the fields F1 to F4 (hereinafter, referred to as the field F1).

The phase difference detection pixel is a pixel for detecting a phase difference between two images based on a pair of light beams passing through two different portions arranged in the row direction X of a pupil region of the imaging optical system of the lens device 40.

The phase difference detection pixel includes a first pixel including a first photoelectric conversion unit that receives one of the pair of light beams and accumulates charges corresponding to the amount of received light, and a second pixel including a second photoelectric conversion unit that receives the other of the pair of light beams and accumulates charges corresponding to the amount of received light.

In the field F1, a plurality of pairs of the first pixel and the second pixel are arranged, and the phase difference can be calculated on the basis of signals read out from the pairs.

It should be noted that the phase difference detection pixel may be composed of pixels including both the first photoelectric conversion unit and the second photoelectric conversion unit.

The driving circuit 63 drives the readout circuit connected to the photoelectric conversion unit of each pixel 61 on a pixel row 62 basis to perform, for example, resetting of each photoelectric conversion unit included in the pixel row 62 for each pixel row 62 and readout of a voltage signal according to charge accumulated in each photoelectric conversion unit to the signal line.

The signal processing circuit 64 performs a correlative double sampling process on the voltage signal read out from each pixel 61 of the pixel row 62 to the signal line, converts the voltage signal after the correlative double sampling process into a digital signal, and outputs the digital signal to the storage unit 52.

The digital signal that is obtained by being read out from an arbitrary pixel 61 to a signal line and then being processed by the signal processing circuit 64 becomes an imaging signal read out from the arbitrary pixel 61.

Figure 4:
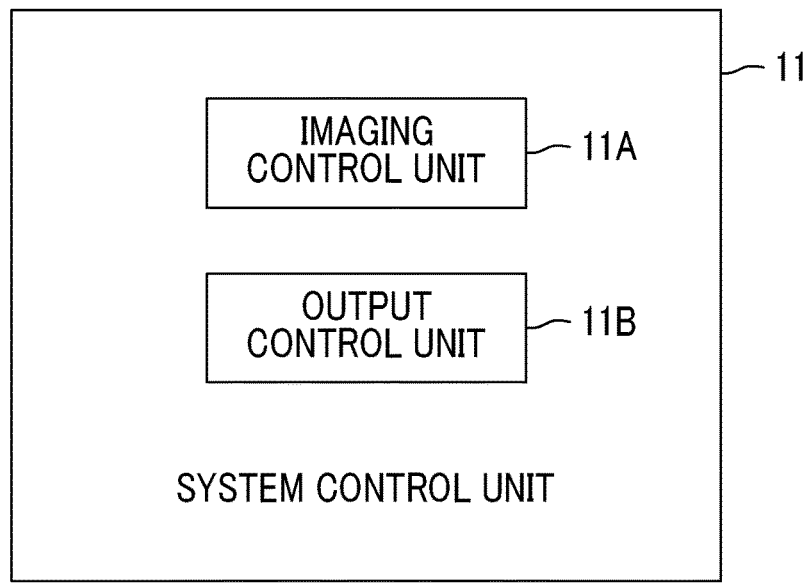
FIG. 4 is a diagram illustrating a functional block of a system control unit 11 illustrated in FIG. 1.

FIG. 4 is a diagram illustrating a functional block of the system control unit 11 illustrated in FIG. 1.

The system control unit 11 functions as an imaging control unit 11A and an output control unit 11B by the processor executing a program including the imaging program.

The imaging control unit 11A performs imaging control for still image storage (first imaging control) and imaging control for live view (second imaging control).

Each of the imaging control for still image storage and the imaging control for live view is performed by exposing all the pixels 61 formed on the light reception surface 60, reading out the imaging signal according to the charge accumulated in the photoelectric conversion unit of each pixel 61 by the exposure, and storing the imaging signal in the storage unit 52.

The output control unit 11B performs a first output control, a second output control, and a third output control.

In the first output control, among the captured image signals composed of the imaging signals that are read out from all the pixels 61 and are stored in the storage unit 52 by the imaging control for still image storage, the imaging signals read out from the pixels 61 included in the pixel row 62 that is selected in a case where the plurality of pixel rows 62 on the light reception surface 60 of the sensor unit 51 are selected one for every N (N is a natural number of 2 or more) in the column direction Y are output from the first output terminal CH0.

In the following description, it is assumed that N=4, and in a case where the first output control is performed, the imaging signals read out from the pixel 61 in the field F1 and stored in the storage unit 52 are output from the first output terminal CH0.

In the second output control, the captured image signals stored in the storage unit 52 by the imaging control for still image storage are divided into M (M is a natural number of 2 or more) groups including imaging signals read out from the pixels 61 in each division area that is obtained in a case where the light reception surface 60 of the sensor unit 51 is divided in the row direction X, the M groups are sequentially selected, and the imaging signal of the selected group is output from the second output terminal CH1.

In the following description, it is assumed that M=4, and in a case where the second output control is performed, the imaging signals of the four groups are sequentially output from the second output terminal CH1.

The imaging control unit 11A performs the imaging control for live view at least once after performing the imaging control for still image storage. In the third output control, after the output of the imaging signal by the first output control is completed, the imaging signals read out from the pixels 61 in the field F1 among the imaging signals stored in the storage unit 52 by the imaging control for live view are output from the first output terminal CH0.

Figure 5:
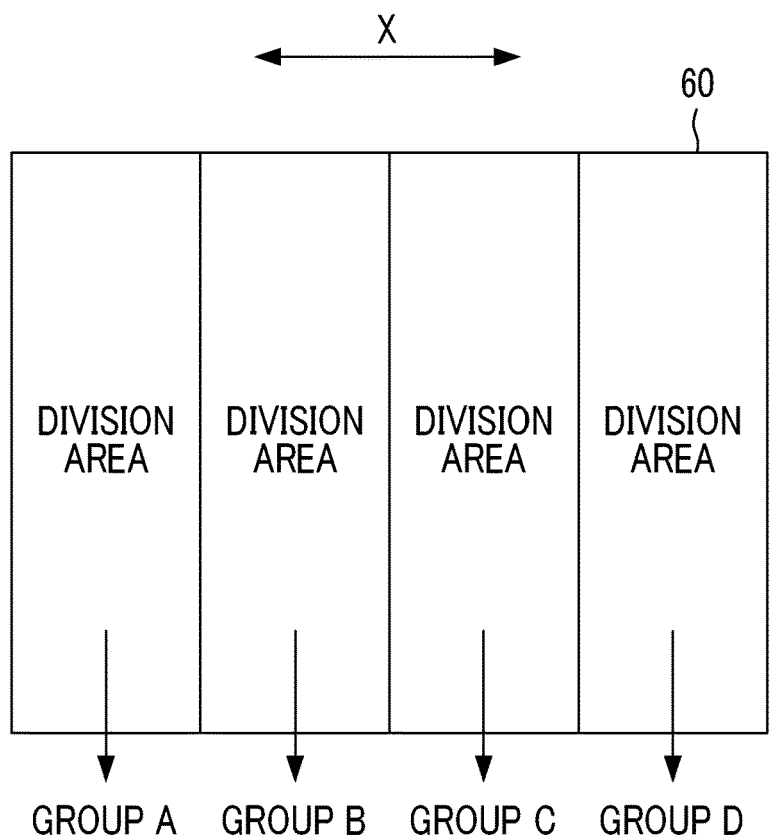
FIG. 5 is a schematic diagram illustrating a configuration in which a light reception surface 60 of the sensor unit 51 is equally divided into four areas in a row direction X.

FIG. 5 is a schematic diagram illustrating a configuration in which the light reception surface 60 of the sensor unit 51 is equally divided into four areas in the row direction X.

A group including imaging signals read out from the pixels 61 in a division area that is the first area from the left end in FIG. 5 is referred to as a group A in the following.

A group including imaging signals read out from the pixels 61 in a division area that is the second area from the left end in FIG. 5 is referred to as a group B in the following.

A group including imaging signals read out from the pixels 61 in a division area that is the third area from the left end in FIG. 5 is referred to as a group C in the following.

A group including imaging signals read out from the pixels 61 in a division area that is the fourth area from the left end in FIG. 5 is referred to as a group D in the following.

Figure 6:
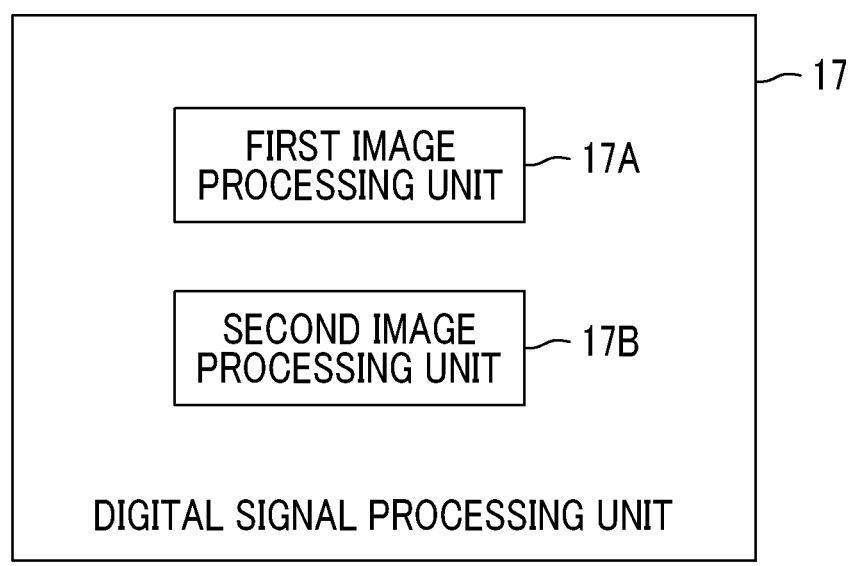
FIG. 6 is a diagram illustrating a functional block of a digital signal processing unit 17 of the digital camera 100 illustrated in FIG. 1.

FIG. 6 is a diagram illustrating a functional block of the digital signal processing unit 17 of the digital camera 100 illustrated in FIG. 1.

The digital signal processing unit 17 functions as a first image processing unit 17A and a second image processing unit 17B by the processor executing a program including the imaging program.

The first image processing unit 17A performs a process on the imaging signals (hereinafter, also referred to as field data) output from the first output terminal CH0 by the first output control and the third output control to generate a captured image data for display.

The second image processing unit 17B performs a process on the imaging signals of each group that are output from the second output terminal CH1 by the second output control to generate divided image data corresponding to the group, and combines the divided image data corresponding to each of the M groups to generate captured image data for storage.

Figure 7:
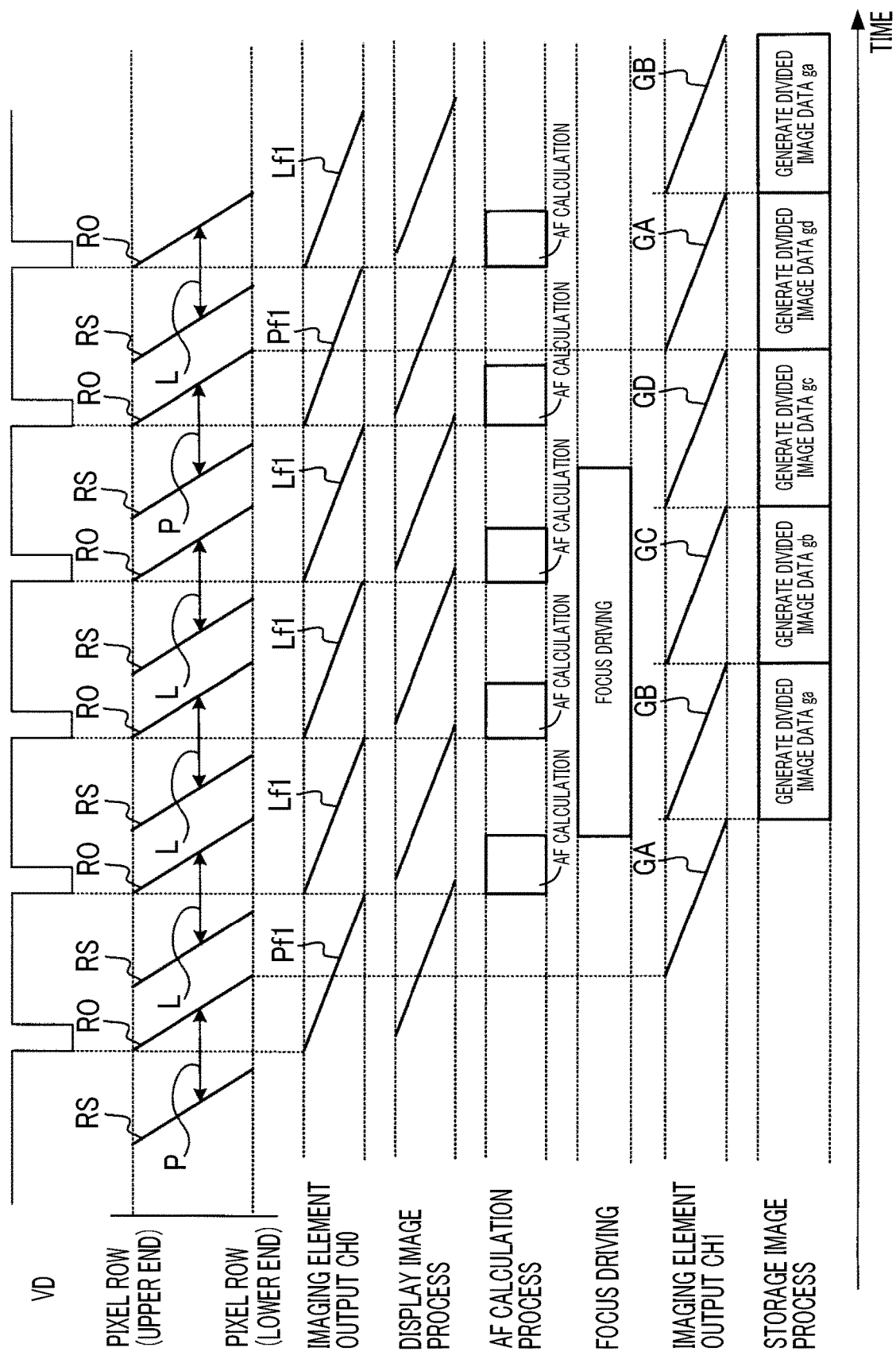
FIG. 7 is a timing chart schematically illustrating an operation of the digital camera 100 illustrated in FIG. 1 in a consecutive mode.

FIG. 7 is a timing chart schematically illustrating an operation of the digital camera 100 illustrated in FIG. 1 in a consecutive mode.

The consecutive mode is an imaging mode in which still images for generating the captured image data to be stored in the storage medium 21 are consecutively captured a plurality of times.

Specifically, in the consecutive mode, imaging control for still image storage is performed a plurality of times according to an imaging instruction of a user by the system control unit 11, and imaging control for live view is performed a plurality of times between the plurality of times of imaging control for still image storage.

In FIG. 7, the horizontal axis indicates time. In the first row of FIG. 7, a vertical synchronization signal VD is illustrated.

In the second row of FIG. 7, a drive timing of each pixel row 62 on the light reception surface 60 of the imaging element 5 is illustrated. In the second row of FIG. 7, the vertical axis indicates a position of the pixel row 62 in the column direction Y.

A straight line RS indicates a timing at which the photoelectric conversion unit of the pixel 61 is reset in each pixel row 62. A straight line RO indicates a timing at which the imaging signal is read out from the photoelectric conversion unit of the pixel 61 in each pixel row 62 and stored in the storage unit 52.

A period P sandwiched between the straight line RS and the straight line RO indicates a period during which imaging control for still image storage is performed. A period L sandwiched between the straight line RS and the straight line RO indicates a period during which imaging control for live view is performed.

In the third row of FIG. 7, next to an "imaging element output CH0", an output state of the imaging signal from the first output terminal CH0 of the storage unit 52 is illustrated.

A straight line Pf1 indicates an output state of the imaging signal (field data) from the first output terminal CH0 to the data bus 25, the imaging signal being read out from the field F1 among the captured image signals stored in the storage unit 52 by the imaging control for still image storage in the period P.

A straight line Lf1 indicates an output state of the imaging signal (field data) from the first output terminal CH0 to the data bus 25, the imaging signal being read out from the field F1 stored in the storage unit 52 by the imaging control for live view in the period L.

In the fourth row of FIG. 7, next to a "display image process", a drawing state of the display unit 23 is illustrated. In the fourth row of FIG. 7, the vertical axis indicates a position of a display pixel row of the display unit 23, and each straight line indicates a timing at which the drawing is performed on the display pixel row of the display unit 23 based on the field data.

In the fifth row of FIG. 7, next to an "AF calculation process", a timing of an auto focus (AF) calculation process performed by the system control unit 11 is illustrated.

Specifically, the AF calculation process includes a process of calculating a phase difference on the basis of the imaging signals read out from the phase difference detection pixel included in the field data, and a process of calculating a defocus amount on the basis of the phase difference.

In the sixth stage of FIG. 7, next to "focus driving", a period during which driving of the focus lens is performed is illustrated.

In the seventh row of FIG. 7, next to an "imaging element output CH1", an output state of the imaging signal from the second output terminal CH1 of the storage unit 52 of the imaging element 5 is illustrated.

A straight line GA indicates an output state of the imaging signal of the group A, from the second output terminal CH1 to the data bus 25, among the captured image signals stored in the storage unit 52 by the imaging control for still image storage in the period P.

A straight line GB indicates an output state of the imaging signal of the group B, from the second output terminal CH1 to the data bus 25, among the captured image signals stored in the storage unit 52 by the imaging control for still image storage in the period P.

A straight line GC indicates an output state of the imaging signal of the group C, from the second output terminal CH1 to the data bus 25, among the captured image signals stored in the storage unit 52 by the imaging control for still image storage in the period P.

A straight line GD indicates an output state of the imaging signal of the group D, from the second output terminal CH1 to the data bus 25, among the captured image signals stored in the storage unit 52 by the imaging control for still image storage in the period P.

In the eighth row of FIG. 7, next to a "storage image process", a generation state of the captured image data performed by the digital signal processing unit 17 is illustrated.

In a case where an imaging instruction is issued, the system control unit 11 performs imaging control for still image storage. In a case where a short period of time elapses after the storage of the imaging signals read out from the pixel 61 in the storage unit 52 by the imaging control is started, the system control unit 11 performs the first output control of sequentially outputting, from the first output terminal CH0 to the data bus 25, the imaging signals read out from the pixel 61 in the field F1 and stored in the storage unit 52 by the imaging control for still image storage (the straight line Pf1 of FIG. 7).

The digital signal processing unit 17 processes imaging signals sequentially output to the data bus 25 at the straight line Pf1 to generate display image data, and transmits the display image data to the display driver 22. The display driver 22 causes the display unit 23 to display the post-view image based on the received display image data.

In a case where the output of the field data at the straight line Pf1 is completed, the system control unit 11 calculates the phase difference on the basis of the imaging signals read out from the phase difference detection pixel included in the field data ("AF calculation" in the drawing).

In a case where the imaging control for still image storage is finished, the system control unit 11 performs the second output control of outputting, from the second output terminal CH1 to the data bus 25, the imaging signal of the group A among the captured image signals stored in the storage unit 52 by the imaging control for still image storage (the straight line GA of FIG. 7).

The digital signal processing unit 17 processes the imaging signal output to the data bus 25 at the straight line GA to generate divided image data ga.

In a case where the output of the imaging signal from the second output terminal CH1 at the straight line GA is completed, the system control unit 11 performs the second output control of outputting, from the second output terminal CH1 to the data bus 25, the imaging signal of the group B among the captured image signals stored in the storage unit 52 by the imaging control for still image storage (the straight line GB of FIG. 7).

The digital signal processing unit 17 processes the imaging signal output to the data bus 25 at the straight line GB to generate divided image data gb.

In a case where the output of the imaging signal from the second output terminal CH1 at the straight line GB is completed, the system control unit 11 performs the second output control of outputting, from the second output terminal CH1 to the data bus 25, the imaging signal of the group C among the captured image signals stored in the storage unit 52 by the imaging control for still image storage (the straight line GC of FIG. 7).

The digital signal processing unit 17 processes the imaging signal output to the data bus 25 at the straight line GC to generate divided image data gc.

In a case where the output of the imaging signal from the second output terminal CH1 at the straight line GC is completed, the system control unit 11 performs the second output control of outputting, from the second output terminal CH1 to the data bus 25, the imaging signal of the group D among the captured image signals stored in the storage unit 52 by the imaging control for still image storage (the straight line GD of FIG. 7).

The digital signal processing unit 17 processes the imaging signal output to the data bus 25 at the straight line GD to generate divided image data gd.

Then, the digital signal processing unit 17 combines the divided image data ga to the divided image data gd respectively corresponding to the groups A to D to generate captured image data for storage, and transmits the captured image data to the storage medium 21 via the external memory control unit 20.

Considering that the signal process is performed on the vicinity of the boundary between the divided image data ga and the divided image data gb, the divided image data gb and the divided image data gc, and the divided image data gc and the divided image data gd, it is preferable that the digital signal processing unit 17 processes the signals of the groups A to D with a width narrower than a width of the groups A to D output to the data bus 25 in the row direction X as a signal processing range to generate the divided image data ga to the divided image data gd. By performing such a process, processing efficiency can be improved.

The system control unit 11 performs the imaging control for live view three times in succession in the example of FIG. 7, after performing the imaging control for still image storage.

The imaging signals read out from the sensor unit 51 by these three times of imaging control are overwritten and stored in the storage unit 52. The system control unit 11 performs the third output control of outputting, from the first output terminal CH0 to the data bus 25, the imaging signals read out from the pixel 61 in the field F1 and stored in the storage unit 52 by the imaging control for live view (the straight line Lf1 of FIG. 7).

The digital signal processing unit 17 processes the imaging signal output to the data bus 25 at the straight line Lf1 to generate display image data, and transmits the display image data to the display driver 22. The display driver 22 causes the display unit 23 to display the live view image based on the received display image data.

In a case where the output of the field data at the straight line Lf1 is completed, the system control unit 11 performs the AF calculation process of calculating the phase difference on the basis of the imaging signals read out from the phase difference detection pixel included in the field data.

The system control unit 11 calculates the defocus amount on the basis of the phase difference calculated based on the second falling timing of the vertical synchronization signal VD of FIG. 7, the third falling timing of the vertical synchronization signal VD of FIG. 7, and the fourth falling timing of the vertical synchronization signal VD of FIG. 7, and performs a focus control by driving the focus lens on the basis of the defocus amount. Whenever the phase difference is calculated, the system control unit 11 may perform the focus control by driving the focus lens on the basis of the phase difference.

The system control unit 11 performs the imaging control for still image storage for capturing the second still image, after performing the third time of the imaging control for live view. The above process is repeatedly performed according to the number of consecutive shots.

In this manner, with the digital camera 100 of FIG. 1, it is possible to display the post-view image at a high speed since, among the captured image signals stored in the storage unit 52 by the imaging control for still image storage, the imaging signals read out from the pixel in the field F1 is transferred from the first output terminal CH0 to the digital signal processing unit 17.

Since the imaging signal output from the first output terminal CH0 includes the imaging signals read out from the phase difference detection pixel, it is possible to perform the focus control on the basis of the imaging signal, and perform the focus control following the object.

The captured image signal stored in the storage unit 52 by the imaging control for still image storage is transferred from the second output terminal CH1 to the digital signal processing unit 17 in a group unit.

Therefore, the digital signal processing unit 17 can start generation of image data without waiting for all the captured image signals to be gathered. Accordingly, it is possible to shorten the time from the start of the imaging control for still image storage to the completion of the generation of the captured image data.

In the digital camera 100, the imaging control for live view is performed between the imaging control for still image storage and the next imaging control for still image storage, but the imaging control for live view is not necessary. By performing the imaging control for live view, it is possible to check the state of the object being imaged in detail.

In a case where the imaging control for live view is omitted, it is possible to reduce the storage capacity of the storage unit 52, and to reduce the manufacturing cost of the digital camera 100.

In the digital camera 100, by setting the number "N" of fields set on the light reception surface 60 and the number "M" of groups set by the output control unit 11B to the same value, the number of imaging signals output from the first output terminal CH0 and the number of imaging signals output from the second output terminal CH1 in a single vertical synchronization period can be set to be the same as each other.

According to this configuration, the transfer rate of the imaging signal from the imaging element 5 to the data bus 25 can be made common, and the driving and signal processing can be simplified.

Figure 8:
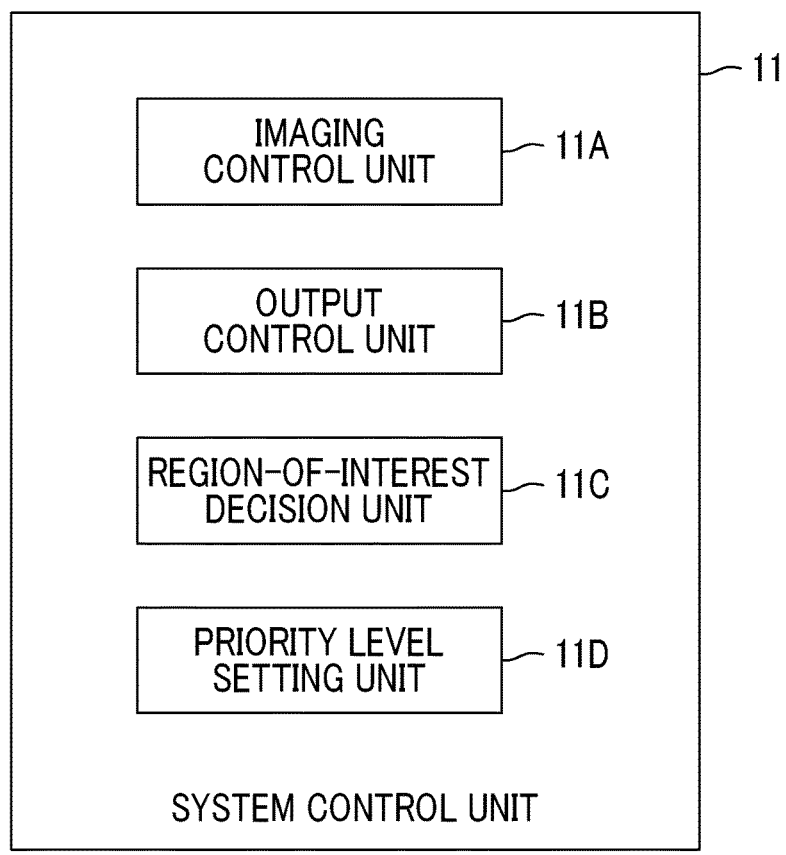
FIG. 8 is a diagram illustrating a modification example of the functional block of the system control unit 11 of the digital camera 100 illustrated in FIG. 1.

FIG. 8 is a diagram illustrating a modification example of the functional block of the system control unit 11 of the digital camera 100 illustrated in FIG. 1.

The system control unit 11 illustrated in FIG. 8 has the same configuration as that in FIG. 6 except that a region-of-interest decision unit 11C and a priority level setting unit 11D are added.

The region-of-interest decision unit 11C decides a region of interest of the object being imaged on the basis of the field data output from the first output terminal CH0 by the first output control.

For example, the region-of-interest decision unit 11C performs a process of detecting a face region from the field data by using a known face detection technique, and decides the detected face region as the region of interest (ROI).

The priority level setting unit 11D sets a priority level for each of M groups into which the captured image signals stored in the storage unit 52 by the imaging control for still image storage are divided.

Specifically, the priority level setting unit 11D sets a priority level equal to or higher than a priority threshold for a group, which includes the imaging signals read out from the pixel 61 in the division area corresponding to the region of interest decided by the region-of-interest decision unit 11C, among the M groups and sets a priority level less than the priority threshold for the other groups.

The image based on the field data and the light reception surface 60 correspond to each other, and if the position of the region of interest in this image is known, the position on the light reception surface 60 corresponding to this region of interest can also be known.

Figure 9:
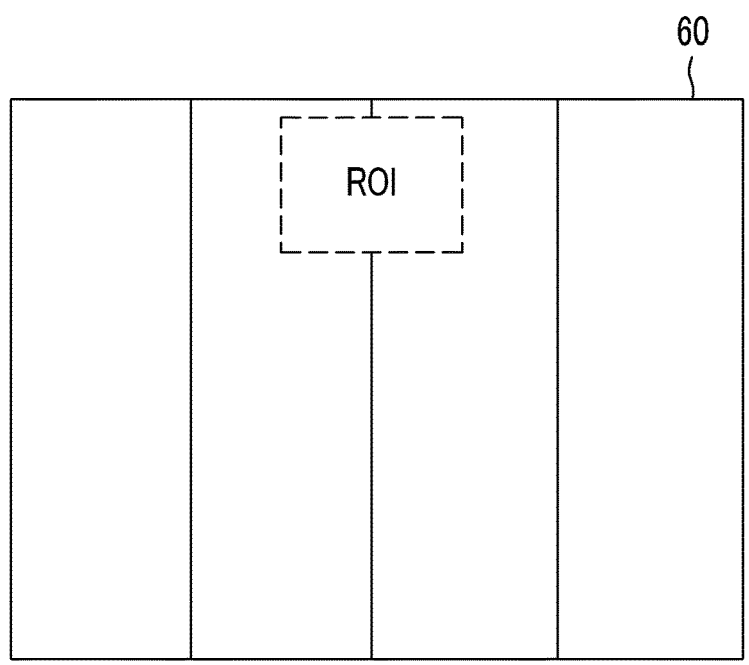
FIG. 9 is a diagram illustrating an example of disposition of a region of interest.

For example, in the light reception surface 60, in a case where a region ROI corresponding to the region of interest is at a position as illustrated in FIG. 9, the two division areas in the middle of the four division areas are the division areas corresponding to the region of interest.

Figure 10:
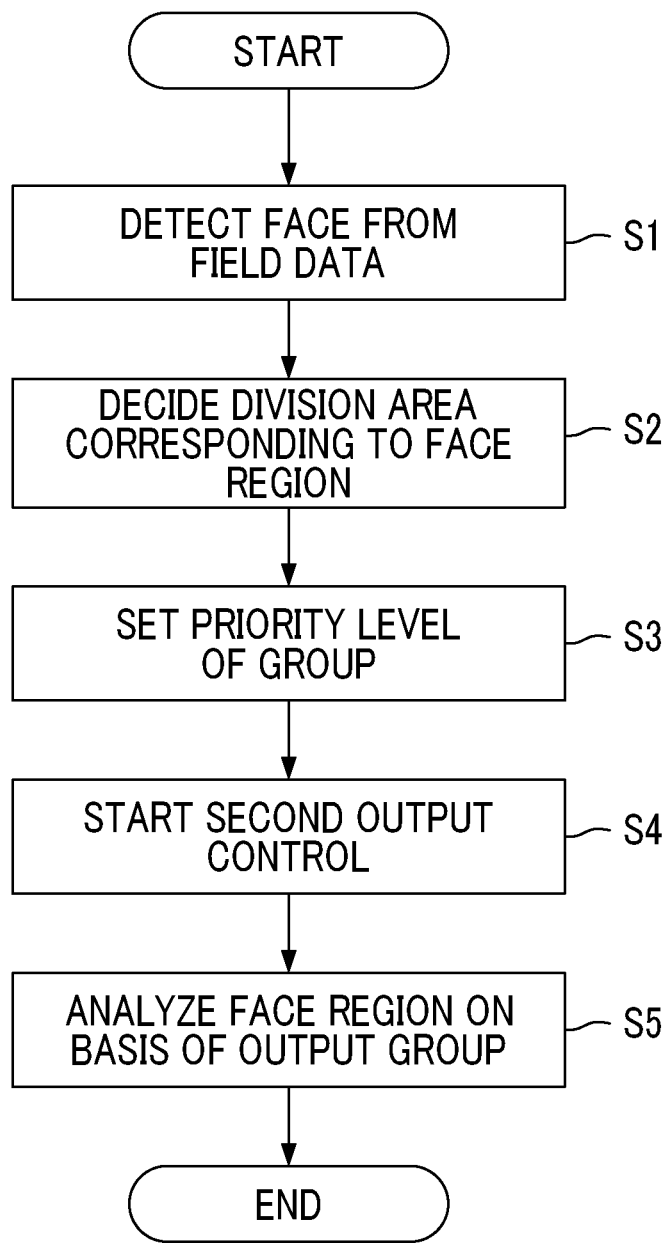
FIG. 10 is a flowchart illustrating an operation of a modification example of the digital camera 100 illustrated in FIG. 1 in the consecutive mode.
Figure 11:
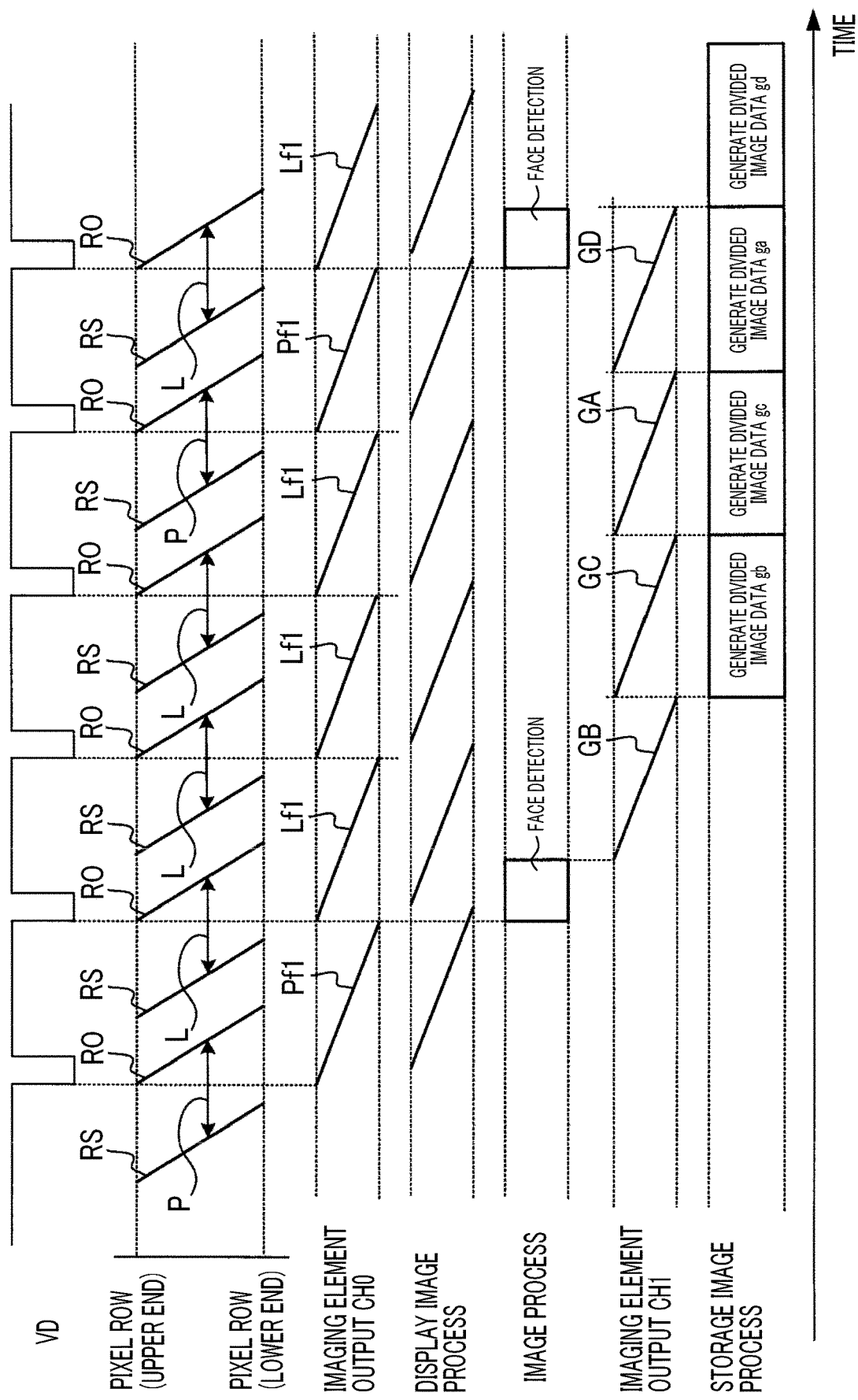
FIG. 11 is a timing chart schematically illustrating an operation of a modification example of the digital camera 100 illustrated in FIG. 1 in the consecutive mode.

FIG. 10 is a flowchart illustrating an operation of a modification example of the digital camera 100 illustrated in FIG. 1 in the consecutive mode. FIG. 11 is a timing chart schematically illustrating an operation of a modification example of the digital camera 100 illustrated in FIG. 1 in the consecutive mode. In FIG. 11, the same components as those in FIG. 7 are denoted by the same reference numerals, and description thereof is omitted.

In a case where the consecutive mode is set and an imaging instruction is issued, the system control unit 11 performs imaging control for still image storage. In a case where a short period of time elapses after the storage of the imaging signals read out from the pixel 61 in the storage unit 52 by the imaging control is started, the system control unit 11 outputs, from the first output terminal CH0 to the data bus 25, the imaging signals read out from the pixel 61 in the field F1 and stored in the storage unit 52 by the imaging control for still image storage (the straight line Pf1 of FIG. 11).

In a case where the output of the field data at the straight line Pf1 in FIG. 11 is completed, the system control unit 11 performs face detection from the field data on the basis of the known face detection technique (step S1).

Next, the system control unit 11 sets a region including the face as the region of interest of the object from the face detection result in step S1, and decides a division area corresponding to the region of interest (step S2).

Next, the system control unit 11 divides the captured image signals stored in the storage unit 52 by the imaging control for still image storage into four groups, sets a priority level equal to or higher than the priority threshold for the group, which includes the imaging signals read out from the pixel 61 in the division area decided in step S2, and sets a priority level less than the priority threshold for the other groups (step S3).

In the example of FIG. 11, the priority levels of the group B and the group C are set to be equal to or higher than the priority threshold, and the priority levels of the group A and the group D are set to be less than the priority threshold.

After step S3, the system control unit 11 starts the second output control according to the priority level set in step S3 (step S4).

Specifically, as illustrated in FIG. 11, the system control unit 11 outputs, from the second output terminal CH1 to the data bus 25, the imaging signal of the group B among the captured image signals stored in the storage unit 52 by the imaging control for still image storage (the straight line GB). The digital signal processing unit 17 generates the divided image data gb on the basis of the imaging signal output at the straight line GB.

In a case where the output of the imaging signal from the second output terminal CH1 at the straight line GB is completed, the system control unit 11 outputs, from the second output terminal CH1 to the data bus 25, the imaging signal of the group C among the captured image signals stored in the storage unit 52 by the imaging control for still image storage (the straight line GC).

The digital signal processing unit 17 processes the imaging signal output to the data bus 25 at the straight line GC to generate the divided image data gc.

In a case where the divided image data gb and the divided image data gc are generated, the digital signal processing unit 17 performs an analysis of the face region included the divided image data gb and the divided image data gc. The analysis result is used, for example, for processing of the captured image data (for example, correction for brightening a face or the like), classification of the captured image data (classification according to persons discriminated from faces), and the like.

In a case where the output of the imaging signal from the second output terminal CH1 at the straight line GC is completed, the system control unit 11 outputs, from the second output terminal CH1 to the data bus 25, the imaging signal of the group A among the captured image signals stored in the storage unit 52 by the imaging control for still image storage (the straight line GA).

The digital signal processing unit 17 processes the imaging signal output to the data bus 25 at the straight line GA to generate the divided image data ga.

In a case where the output of the imaging signal from the second output terminal CH1 at the straight line GA is completed, the system control unit 11 outputs, from the second output terminal CH1 to the data bus 25, the imaging signal of the group D among the captured image signals stored in the storage unit 52 by the imaging control for still image storage (the straight line GD).

The digital signal processing unit 17 processes the imaging signal output to the data bus 25 at the straight line GD to generate the divided image data gd.

Then, the digital signal processing unit 17 combines the divided image data ga to the divided image data gd respectively corresponding to the groups A to D to generate captured image data for storage, and transmits the captured image data to the storage medium 21 via the external memory control unit 20.

In this manner, with the digital camera 100 including the system control unit 11 illustrated in FIG. 8, it is possible to preferentially output, from the second output terminal CH1, the imaging signals of the group including the region of interest among the captured image signals stored in the storage unit 52 by the imaging control for still image storage on the basis of the field data output from the first output terminal CH0 by the first output control.

Therefore, it is possible to finish the detailed analysis of the region of interest at an early stage, and to efficiently perform a process at the later stage using the analysis result.

In the above description, the region-of-interest decision unit 11C performs the process of detecting the face region from the field data and decides the face region as the region of interest, but the invention is not limited thereto.

For example, a process of detecting a moving body region included in the object being imaged may be performed based on a plurality of pieces of field data consecutively output from the first output terminal CH0 by the first output control and the third output control, and the moving body region may be decided as the region of interest.

According to this configuration, since the imaging signals of the group including the moving body can be preferentially output from the second output terminal CH1, it is possible to quickly start the detailed analysis of the moving body, and to efficiently perform a process at the later stage using the analysis result.

Specifically, the priority level setting unit 11D may set a priority level equal to or higher than a priority threshold for a group, which includes the imaging signals read out from the pixel 61 in a division area overlapping a focus area selected by the user from among a plurality of focus areas that are set on the light reception surface 60 and are to be focused, among the M groups and set a priority level less than the priority threshold for the other groups.

According to this configuration, it is possible to quickly start the detailed analysis of the object in the focus area, and to efficiently perform a process at the later stage using the analysis result.

Figure 12:
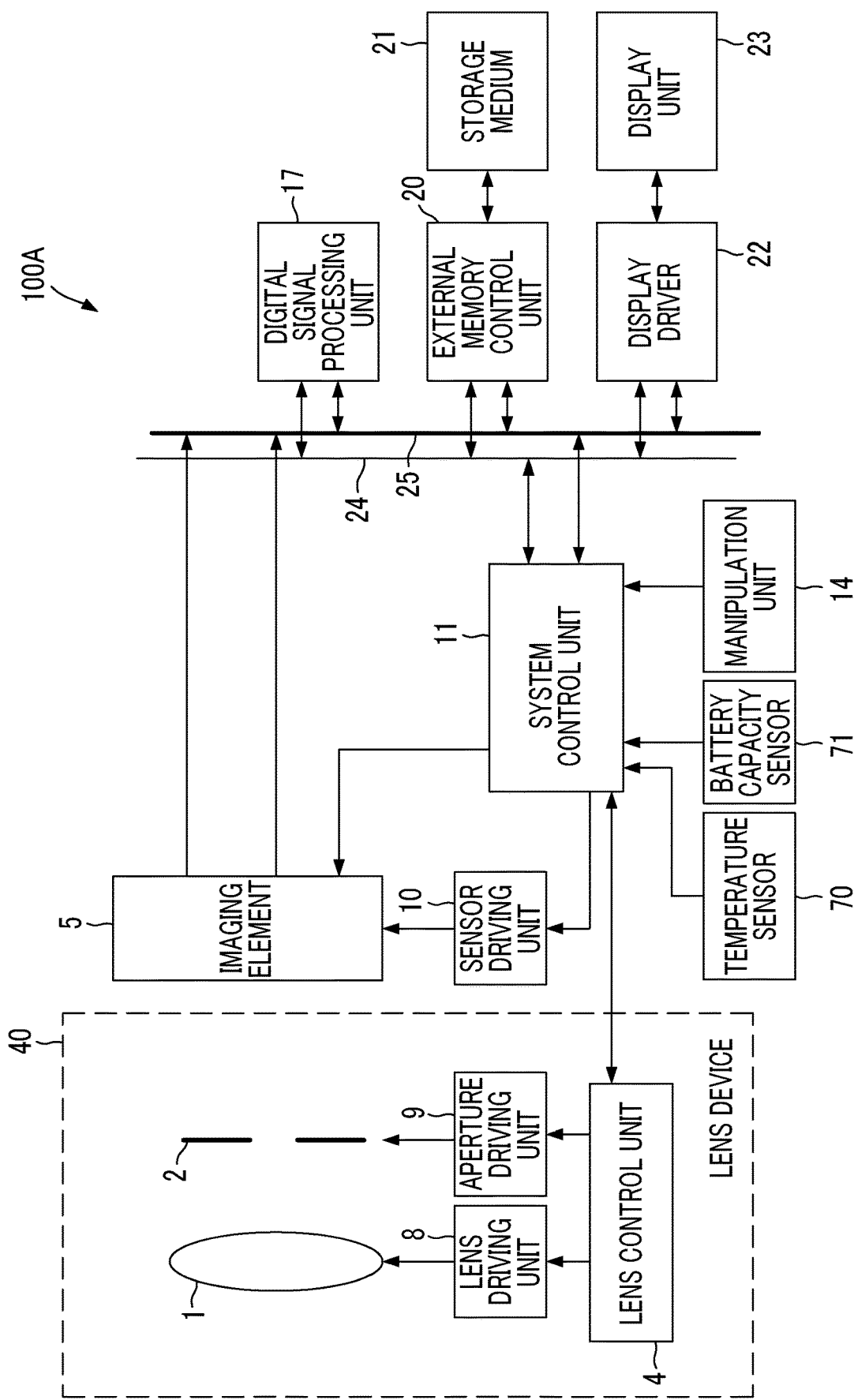
FIG. 12 is a diagram illustrating a schematic configuration of a digital camera 100A that is a modification example of the digital camera 100 illustrated in FIG. 1.

FIG. 12 is a diagram illustrating a schematic configuration of a digital camera 100A that is a modification example of the digital camera 100 illustrated in FIG. 1.

The digital camera 100 A illustrated in FIG. 12 has the same configuration as the digital camera 100 illustrated in FIG. 1, except that a temperature sensor 70 and a battery capacity sensor 71 are added.

The temperature sensor 70 detects the temperature inside the digital camera 100A. The detected temperature information is input to the system control unit 11.

The battery capacity sensor 71 detects the capacity of the battery mounted on the digital camera 100A. The detected battery information is input to the system control unit 11.

In a case where the temperature inside the digital camera 100A based on the temperature information acquired from the temperature sensor 70 is equal to or higher than a temperature threshold, or in a case where the battery remaining capacity based on the battery information acquired from the battery capacity sensor 71 is equal to or less than a remaining capacity threshold, the imaging control unit 11A of the system control unit 11 sets a transfer mode at the time of transferring the imaging signal from the second output terminal CH1 to the data bus 25, to a field transfer mode.

In a case where the temperature inside the digital camera 100A is less than the temperature threshold, or in a case where the battery remaining capacity is greater than the remaining capacity threshold, the imaging control unit 11A sets the transfer mode at the time of transferring the imaging signal from the second output terminal CH1 to the data bus 25, to a group transfer mode.

The field transfer mode is a mode in which the second output control is stopped and, among the captured image signals stored in the storage unit 52 by the imaging control for still image storage, the imaging signals except the imaging signals output from the first output terminal CH0 by the first output control are output from the second output terminal CH1 in a field unit.

The group transfer mode is a mode in which the above described second output control is performed and the captured image signals stored in the storage unit 52 by the imaging control for still image storage are output from the second output terminal CH1 in a group unit.

Figure 13:
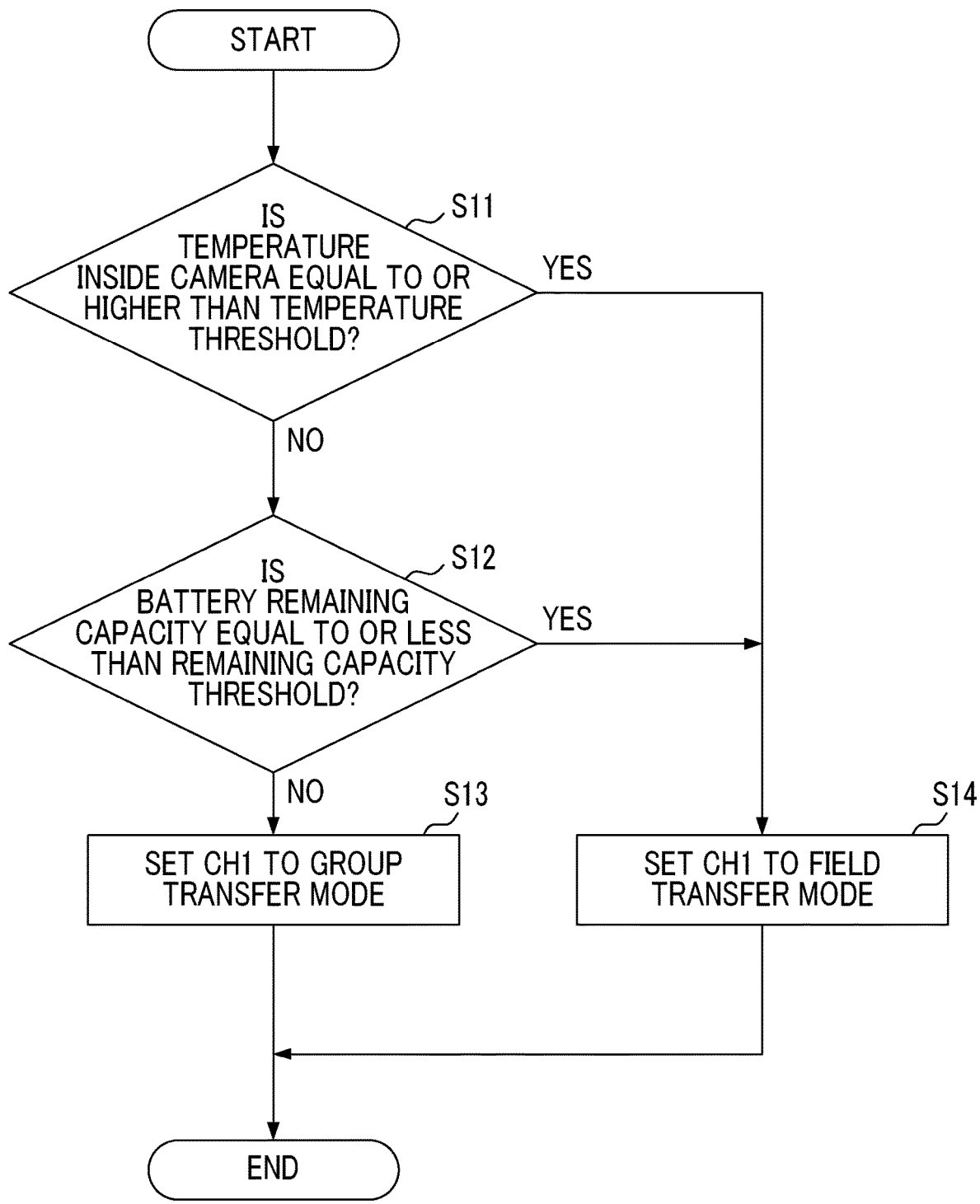
FIG. 13 is a flowchart illustrating a setting operation of a transfer mode of the digital camera 100A illustrated in FIG. 12.

FIG. 13 is a flowchart illustrating a setting operation of a transfer mode of the digital camera 100A illustrated in FIG. 12.

Immediately before the imaging control for still image storage is started, the system control unit 11 determines whether the temperature inside the digital camera 100A is equal to or higher than the temperature threshold based on the temperature information acquired from the temperature sensor 70, (step S11).

In a case where it is determined that the temperature is lower than the temperature threshold (step S11: NO), the system control unit 11 determines whether the battery remaining capacity is equal to or less than the remaining capacity threshold based on the battery information acquired from the battery capacity sensor 71 (Step S12).

In a case where it is determined that the battery remaining capacity is greater than the remaining capacity threshold (step S12: NO), the system control unit 11 sets the transfer mode to the group transfer mode (step S13). The operation in the group transfer mode is described using the timing chart of FIG. 7, and thus the description thereof is omitted here.

In a case where it is determined that the temperature inside the digital camera 100A is equal to or higher than the temperature threshold (step S11: YES), or in a case where it is determined that the battery remaining capacity is equal to or less than the remaining capacity threshold (step S12: YES), the system control unit 11 sets the transfer mode to the field transfer mode (step S14).

Figure 14:
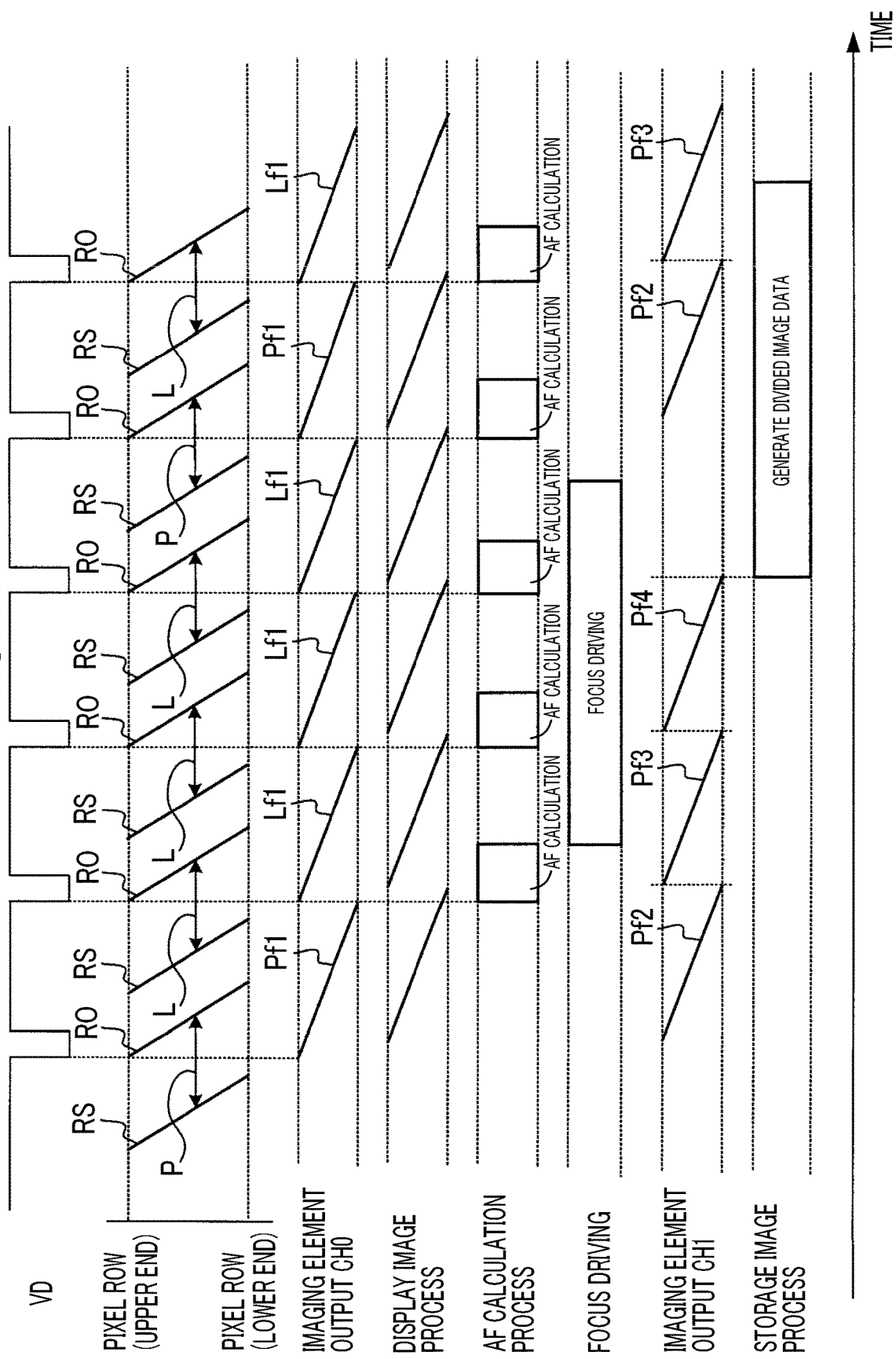
FIG. 14 is a timing chart schematically illustrating an operation of a case where the digital camera 100A illustrated in FIG. 12 is set in the consecutive mode and the field transfer mode.

FIG. 14 is a timing chart schematically illustrating an operation of a case where the digital camera 100A illustrated in FIG. 12 is set in the consecutive mode and the field transfer mode.

The timing chart illustrated in FIG. 14 is the same as the timing chart illustrated in FIG. 7, except that the status of the "imaging element output CH1" and the status of the "storage image process" are different.

In a case where an imaging instruction is issued, the system control unit 11 performs imaging control for still image storage. In a case where a short period of time elapses after the storage of the imaging signals read out from the pixel 61 in the storage unit 52 by the imaging control is started, the system control unit 11 performs the first output control of outputting, from the first output terminal CH0 to the data bus 25, the imaging signals read out from the pixel 61 in the field F1 and stored in the storage unit 52 by the imaging control for still image storage (the straight line Pf1 of FIG. 14).

In a case where a short period of time elapses after the output of the field data at the straight line Pf1, the system control unit 11 outputs, from the second output terminal CH1 to the data bus 25, the imaging signals read out from the pixel 61 in the field F2 and stored in the storage unit 52 by the imaging control for still image storage (the straight line Pf2 of FIG. 14).

In a case where the output of the imaging signals at the straight line Pf2 is finished, the system control unit 11 outputs, from the second output terminal CH1 to the data bus 25, the imaging signals read out from the pixel 61 in the field F3 and stored in the storage unit 52 by the imaging control for still image storage (the straight line Pf3 of FIG. 14).

In a case where the output of the imaging signals at the straight line Pf3 is finished, the system control unit 11 outputs, from the second output terminal CH1 to the data bus 25, the imaging signals read out from the pixel 61 in the field F4 and stored in the storage unit 52 by the imaging control for still image storage (the straight line Pf4 of FIG. 14).

Then, the digital signal processing unit 17 processes the imaging signals output by each of the straight line Pf1, the straight line Pf2, the straight line Pf3, and the straight line Pf4 to generate captured image data for storage, and stores the captured image data in the storage medium 21 via the external memory control unit 20.

As described above, with the digital camera 100A, in the consecutive mode, the operation illustrated in FIG. 7 and the operation illustrated in FIG. 14 can be switched on the basis of the internal temperature and the battery remaining capacity.

In the operation illustrated in FIG. 14, the number of imaging signals output from the imaging element 5 can be reduced as compared with the operation illustrated in FIG. 7. Therefore, it is possible to reduce the power consumption required for the transfer of signals from the imaging element 5, and to suppress heat generation or prolong the operation time.

It is preferable that in the field transfer mode, the system control unit 11 sets an output speed of the imaging signals from the second output terminal CH1 to be lower than an output speed of the imaging signals from the first output terminal CH0 by the first output control.

According to this configuration, the output speed of the imaging signals from the second output terminal CH1 is low, and therefore the power consumption required for the transfer of the imaging signals can be further reduced.

In the digital camera 100A, the system control unit 11 switches the transfer mode between the group transfer mode and the field transfer mode on the basis of the internal temperature and the battery remaining capacity. However, the transfer mode may be fixed to the group transfer mode regardless of the internal temperature and the battery remaining capacity, and the output speed of the imaging signals from the second output terminal CH1 at the time of performing the second output control may be changed.

Figure 15:
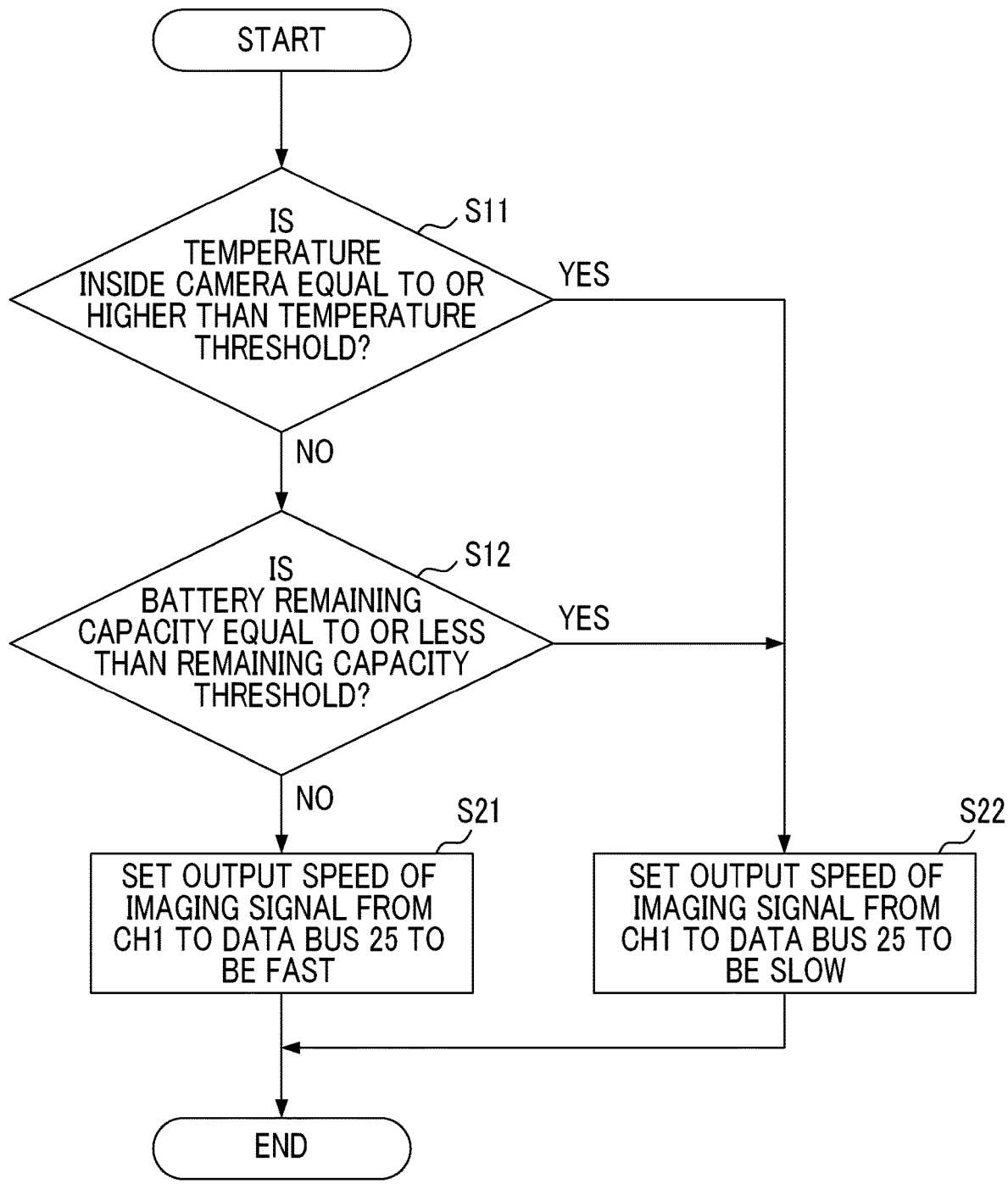
FIG. 15 is a flowchart illustrating a modification example of the operation of the digital camera 100A illustrated in FIG. 12.

FIG. 15 is a flowchart illustrating a modification example of the operation of the digital camera 100A illustrated in FIG. 12. In FIG. 15, the same processes as those in FIG. 13 are denoted by the same reference numerals, and description thereof is omitted.

In a case where it is determined that the battery remaining capacity is greater than the remaining capacity threshold (step S12: NO), the system control unit 11 sets the output speed of the imaging signals from the second output terminal CH1 at the time of performing the second output control to a first value (high speed) (step S21).

In a case where it is determined that the temperature inside the digital camera 100A is equal to or higher than the temperature threshold (step S11: YES), or in a case where it is determined that the battery remaining capacity is equal to or less than the remaining capacity threshold (step S12: YES), the system control unit 11 sets the output speed of the imaging signals from the second output terminal CH1 at the time of performing the second output control to a second value (low speed) lower than the first value (step S22).

As described above, according to the operation illustrated in FIG. 15, in a case where the temperature inside the digital camera 100A is high or in a case where the battery remaining capacity is small, the output speed of the imaging signals from the second output terminal CH1 is low, and therefore, heat generation and power consumption can be reduced.

In the flowcharts of FIGS. 13 and 15, either step S11 or step S12 may be omitted. Even in such a case, it is possible to obtain the effect of reducing heat generation and power consumption.

In the above description, the system control unit 11 divides the captured image signal stored in the storage unit 52 into groups in the row direction X, but the method of dividing the captured image signals is not limited thereto.

Figure 16:
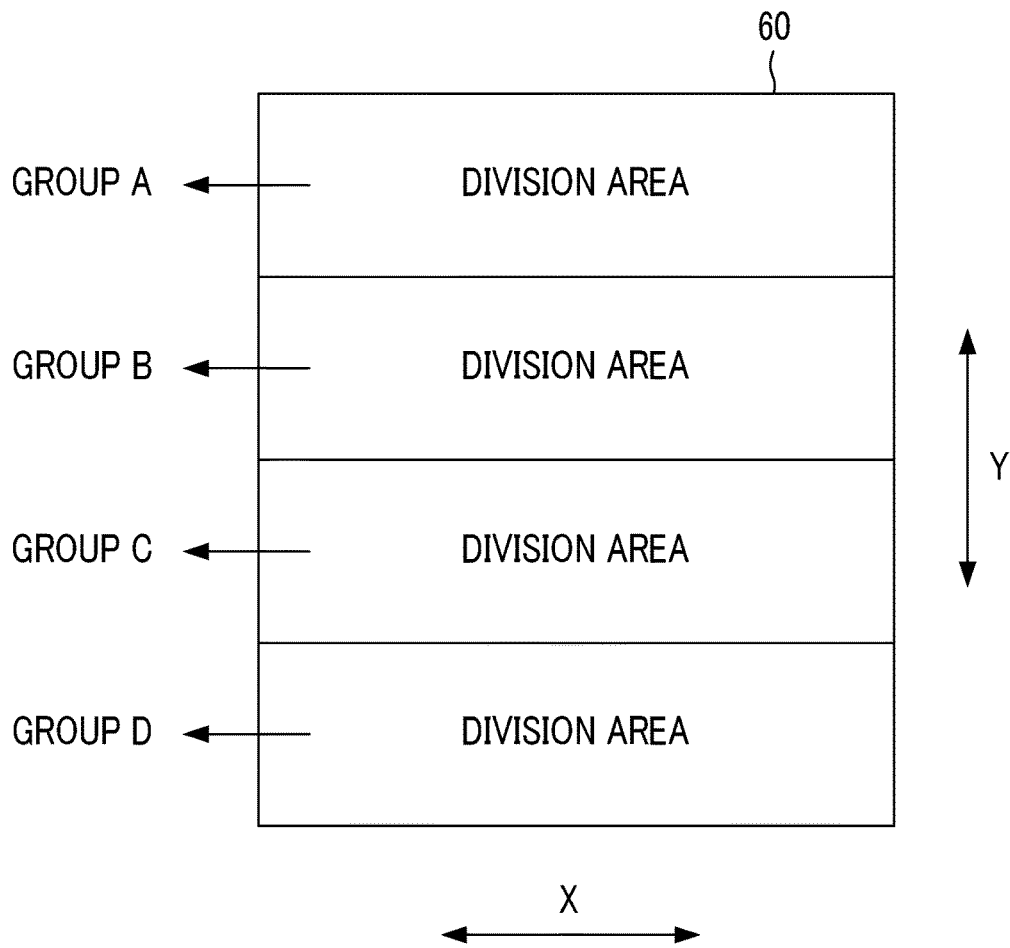
FIG. 16 is a schematic diagram illustrating a division example of the light reception surface 60 of the sensor unit 51.
Figure 17:
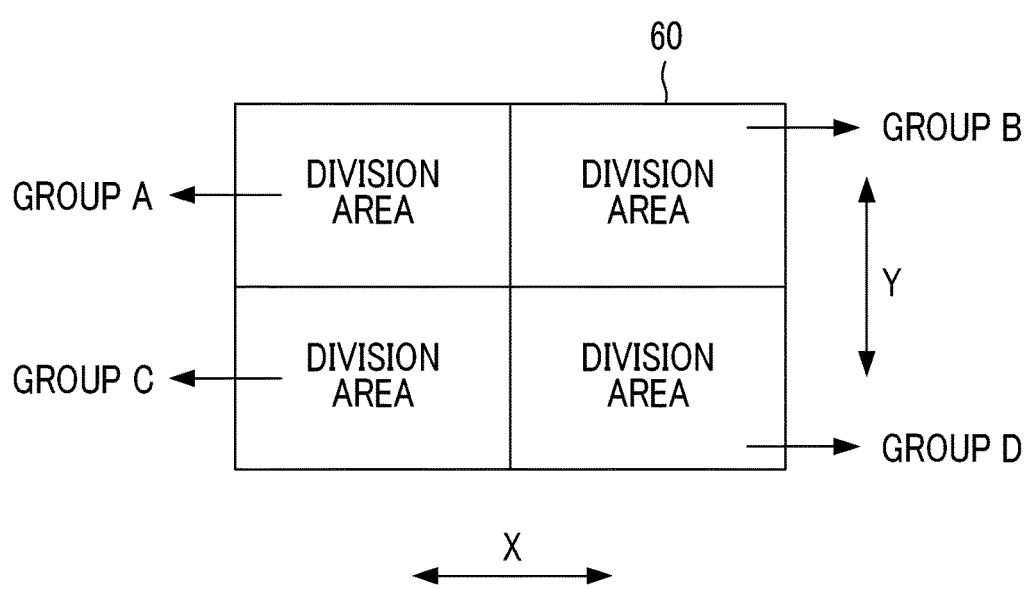
FIG. 17 is a schematic diagram illustrating another division example of the light reception surface 60 of the sensor unit 51.

FIGS. 16 and 17 are schematic diagrams illustrating an example of dividing the light reception surface 60 of the sensor unit 51 into a plurality of areas.

FIG. 16 illustrates a configuration of a case where the light reception surface 60 of the sensor unit 51 is equally divided into four areas in the column direction Y.

In the division example of FIG. 16, a group including imaging signals read out from the pixels 61 in a division area that is the first area from the upper end is referred to as the group A, and a group including imaging signals read out from the pixels 61 in a division area that is the second area from the upper end is referred to as the group B.

In addition, a group including imaging signals read out from the pixels 61 in a division area that is the third area from the upper end is referred to as the group C, and a group including imaging signals read out from the pixels 61 in a division area that is the fourth area from the upper end is referred to as the group D.

FIG. 17 illustrates a configuration of a case where the light reception surface 60 of the sensor unit 51 is equally divided into two areas in the row direction X and is further equally divided into two areas in the column direction Y.

In the division example of FIG. 17, a group including imaging signals read out from the pixels 61 in an upper left division area is referred to as the group A, and a group including imaging signals read out from the pixels 61 in an upper right division area is referred to as the group B.

In addition, a group including imaging signals read out from the pixels 61 in a lower left division area is referred to as the group C, and a group including imaging signals read out from the pixels 61 in a lower right division area is referred to as the group D.

According to the division example illustrated in FIG. 17 and the division example illustrated in FIG. 5, it is possible to reduce the width of each group in the row direction X. Therefore, it is possible to reduce the capacity of a line memory used for generating the image data by the digital signal processing unit 17, and to reduce the manufacturing cost of the digital camera.

The digital camera has been described as an example of the imaging device so far. Hereinafter, an embodiment of a smartphone with a camera will be described as the imaging device.

Figure 18:
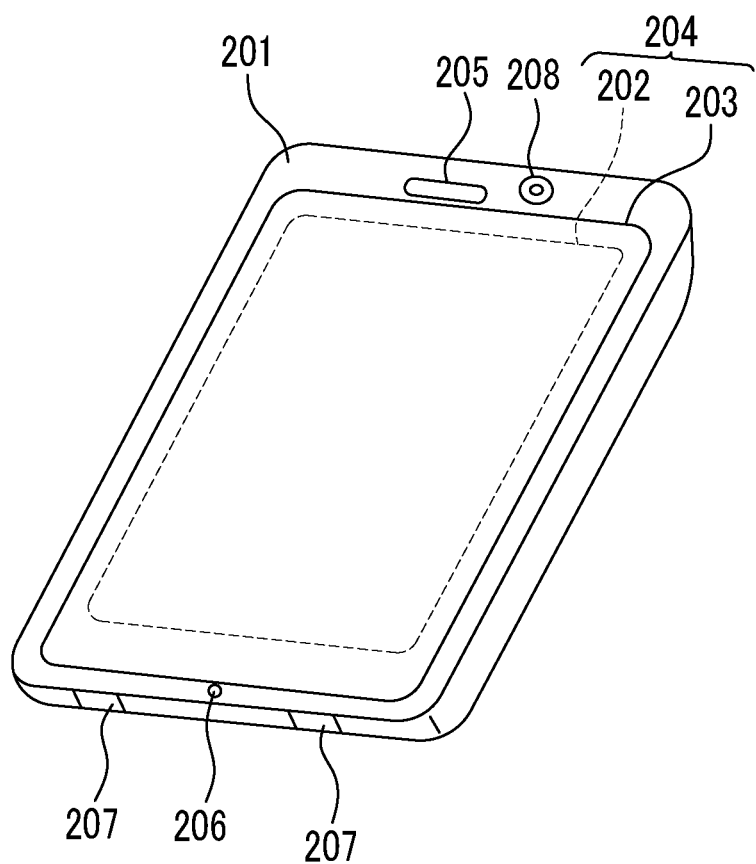
FIG. 18 illustrates an appearance of a smartphone 200 which is an embodiment of the imaging device of the present invention.

FIG. 18 illustrates an appearance of a smartphone 200 which is an embodiment of the imaging device of the present invention.

The smartphone 200 illustrated in FIG. 18 has a flat casing 201, and comprises a display input unit 204, in which a display panel 202 as a display unit and a manipulation panel 203 as an input unit are integrated, on one surface of the casing 201.

Further, such a casing 201 comprises a speaker 205, a microphone 206, a manipulation unit 207, and a camera unit 208.

It should be noted that a configuration of the casing 201 is not limited thereto. For example, a configuration in which the display unit and the input unit are independent can be adopted, or a configuration having a folding structure or a sliding mechanism can be adopted.

Figure 19:
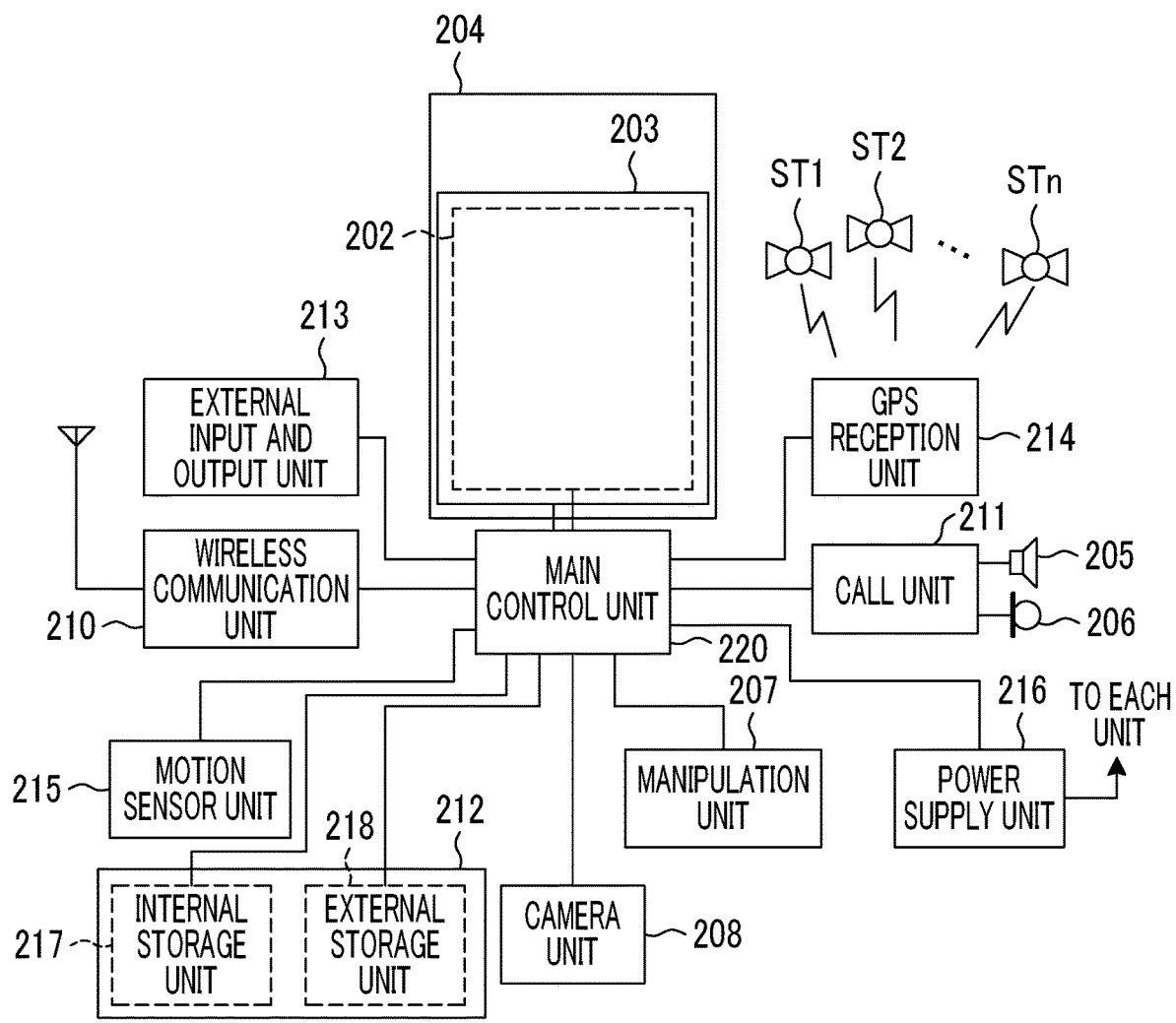
FIG. 19 is a block diagram illustrating a configuration of the smartphone 200 illustrated in FIG. 18.

FIG. 19 is a block diagram illustrating a configuration of the smartphone 200 illustrated in FIG. 18.

As illustrated in FIG. 19, the smartphone comprises, as main components, a wireless communication unit 210, the display input unit 204, a call unit 211, the manipulation unit 207, the camera unit 208, the storage unit 212, an external input and output unit 213, a global positioning system (GPS) reception unit 214, a motion sensor unit 215, a power supply unit 216, and a main control unit 220.

In addition, the smartphone 200 includes, as a main function, a wireless communication function of performing mobile wireless communication via a base station device BS (not illustrated) and a mobile communication network NW (not illustrated).

The wireless communication unit 210 performs wireless communication with the base station device BS accommodated in the mobile communication network NW according to an instruction from the main control unit 220. Using the wireless communication, the wireless communication unit 210 performs transmission and reception of various types of file data such as audio data and image data, e-mail data, or the like, or reception of web data, streaming data, or the like.

The display input unit 204 is a so-called touch panel that displays an image (a still image or a moving image), text information, or the like to visually transfer information to the user, and detects a user manipulation with respect to the displayed information under the control of the main control unit 220, and comprises the display panel 202 and the manipulation panel 203.

For the display panel 202, a liquid crystal display (LCD), an organic electro-luminescence display (OELD), or the like is used as a display device.

The manipulation panel 203 is a device that is placed such that an image displayed on the display surface of the display panel 202 can be visually recognized, and detects one or a plurality of coordinates, which is manipulated by a finger of a user or a stylus. In a case in which this device is manipulated by the finger of the user or the stylus, a detection signal generated due to the manipulation is output to the main control unit 220. Then, the main control unit 220 detects a manipulation position (coordinates) on the display panel 202 on the basis of the received detection signal.

As illustrated in FIG. 18, the display panel 202 and the manipulation panel 203 of the smartphone 200 illustrated as an embodiment of the imaging device of the present invention are integrated to constitute the display input unit 204, but the manipulation panel 203 is disposed to completely cover the display panel 202.

In a case in which such a disposition has been adopted, the manipulation panel 203 may also have a function of detecting a user manipulation in an area outside the display panel 202. In other words, the manipulation panel 203 may include a detection area (hereinafter referred to as a display area) for an overlapping portion where the manipulation panel 203 overlaps the display panel 202, and a detection area (hereinafter referred to as a non-display area) for an outer edge portion where the manipulation panel 203 does not overlap the display panel 202 other than the display area.

It should be noted that although a size of the display area may perfectly match a size of the display panel 202, it is not always necessary to match the size of the display area with the size of the display panel 202. In addition, the manipulation panel 203 may include two sensitive areas including an outer edge portion and an inner portion other than the outer edge portion. Further, a width of the outer edge portion is appropriately designed according to a size of the casing 201, or the like.

Furthermore, examples of a position detection scheme adopted in the manipulation panel 203 may include a matrix switching scheme, a resistive film scheme, a surface acoustic wave scheme, an infrared scheme, an electromagnetic induction scheme, and a capacitive scheme, and any one of the schemes can also be adopted.

The call unit 211 comprises the speaker 205 or the microphone 206, and the call unit 211 converts a voice of the user input through the microphone 206 into audio data that can be processed by the main control unit 220 and outputs the audio data to the main control unit 220, or decodes audio data received by the wireless communication unit 210 or the external input and output unit 213 and outputs the decoded audio data from the speaker 205.

Further, as illustrated in FIG. 18, for example, the speaker 205 can be mounted on the same surface as a surface on which the display input unit 204 is provided, and the microphone 206 can be mounted on a side surface of the casing 201.

The manipulation unit 207 is a hardware key using a key switch or the like, and receives an instruction from the user. For example, as illustrated in FIG. 18, the manipulation unit 207 is a push button type switch that is mounted on the side surface of the casing 201 of the smartphone 200, is turned on in a case in which the manipulation unit 207 is pressed by a finger or the like, and is turned off by a restoring force of a spring or the like in a case in which the finger is released.

The storage unit 212 stores a control program or control data of the main control unit 220, application software, address data in which a name, a telephone number, or the like of a communication partner is associated, transmitted or received data of an e-mail, web data downloaded by web browsing, and downloaded content data, and temporarily stores streaming data or the like. Further, the storage unit 212 includes an internal storage unit 217 built in the smartphone and an external storage unit 218 having a slot for a detachable external memory.

It should be noted that the internal storage unit 217 and the external storage unit 218 constituting the storage unit 212 are realized by a storage medium such as a flash memory type, hard disk type, multimedia card micro type, or card type of memory (for example, a MicroSD (registered trademark) memory), a random access memory (RAM), or a read only memory (ROM).

The external input and output unit 213 serves as an interface with all external devices connected to the smartphone 200, and is a unit for direct or indirect connection to other external devices through communication (for example, universal serial bus (USB) or IEEE 1394) or a network (for example, the Internet, a wireless LAN, Bluetooth (registered trademark), radio frequency identification (RFID), infrared communication (infrared data association: IrDA) (registered trademark), ultra-wide band (UWB) (registered trademark), or ZigBee (registered trademark)).

Examples of the external devices connected to the smartphone 200 include a wired/wireless headset, a wired/wireless external charger, a wired/wireless data port, a memory card or a subscriber identity module (SIM)/user identity module (UIM) card connected via a card socket, an external audio and video device connected via an audio and video input/output (I/O) terminal, an external audio and video device that is connected wirelessly, a smartphone connected by a cable/wirelessly, a personal computer connected by a cable/wirelessly, a PDA connected by a cable/wirelessly, and an earphone connected by a cable/wirelessly.

The external input and output unit 213 transfers data transmitted from such an external device to internal components of the smartphone 200 or transfers data inside the smartphone 200 to the external device.

According to an instruction from the main control unit 220, the GPS reception unit 214 receives GPS signals transmitted from GPS satellites ST1 to STn, and executes a positioning calculation process based on the plurality of received GPS signals to detect a position represented by the latitude, longitude, and altitude of the smartphone 200.

In a case in which position information can be acquired from the wireless communication unit 210 or the external input and output unit 213 (for example, a wireless LAN), the GPS reception unit 214 can also detect the position using the position information.

The motion sensor unit 215 comprises, for example, a triaxial acceleration sensor or the like, and detects a physical movement of the smartphone 200 according to an instruction from the main control unit 220. By detecting the physical movement of the smartphone 200, a moving direction or an acceleration of the smartphone 200 is detected. A result of the detection is output to the main control unit 220.

The power supply unit 216 supplies power accumulated in a battery (not illustrated) to each unit of the smartphone 200 according to an instruction from the main control unit 220.

The main control unit 220 comprises a microprocessor, operates according to a control program or control data stored in the storage unit 212, and totally controls each unit of the smartphone 200.

In addition, the main control unit 220 includes a mobile communication control function of controlling each unit of the communication system and an application processing function in order to perform audio communication or data communication through the wireless communication unit 210.

The application processing function is realized by the main control unit 220 operating according to the application software stored in the storage unit 212.

Examples of the application processing function include an infrared communication function of controlling the external input and output unit 213 to perform data communication with an opposite device, an e-mail function of transmitting and receiving an e-mail, and a web browsing function of browsing a web page.

Further, the main control unit 220 includes an image processing function such as displaying an image on the display input unit 204 on the basis of image data (data of a still image or moving image) such as received data or downloaded streaming data.

The image processing function is a function of the main control unit 220 decoding the image data, applying image processing to a result of the decoding, and displaying the image on the display input unit 204.

Further, the main control unit 220 executes display control for the display panel 202 and manipulation detection control for detecting a user manipulation through the manipulation unit 207 and manipulation panel 203. Through the execution of the display control, the main control unit 220 displays a window for displaying a software key such as an icon or a scroll bar for activating application software or creating an e-mail.

It should be noted that the scroll bar is a software key for receiving an instruction to move a display portion of an image with respect to a large image or the like which does not fit in the display area of the display panel 202.

Further, through the execution of the manipulation detection control, the main control unit 220 detects a user manipulation through the manipulation unit 207, receives a manipulation with respect to the icon or an input of a character string to an input field of the window through the manipulation panel 203, or receives a scroll request of a display image through the scroll bar.

Furthermore, through the execution of the manipulation detection control, the main control unit 220 includes a touch panel control function of determining whether a manipulation position on the manipulation panel 203 is in the overlapping portion (the display area) where the manipulation panel 203 overlaps the display panel 202 or in the outer edge portion (the non-display area) where the manipulation panel 203 does not overlap the display panel 202, other than the display area, and controlling a sensitive area of the manipulation panel 203 or a display position of the software key.

Further, the main control unit 220 can detect a gesture manipulation with respect to the manipulation panel 203 and execute a preset function according to the detected gesture manipulation. The gesture manipulation is not a simple touch manipulation in the related art, but is a manipulation for drawing a trajectory with respect to at least one of a plurality of positions by drawing a trajectory with a finger or the like, by designating a plurality of positions simultaneously, or in a combination thereof.

The camera unit 208 includes configurations other than the external memory control unit 20, the storage medium 21, and the manipulation unit 14 in the digital camera illustrated in FIGS. 1 and 12. The display driver 22 of the camera unit 208 drives the display panel 202 instead of the display unit 23.

The captured image data generated by the camera unit 208 can be stored in the storage unit 212 or output via the external input and output unit 213 or the wireless communication unit 210.

In the smartphone 200 illustrated in FIG. 18, the camera unit 208 is mounted on the same surface as the surface on which the display input unit 204 is provided, but a mounting position of the camera unit 208 is not limited thereto, and the camera unit 208 may be mounted on a back surface of the casing 201.

In addition, the camera unit 208 can be used for various functions of the smartphone 200. For example, an image acquired by the camera unit 208 can be displayed on the display panel 202. The image of the camera unit 208 can be used as one of manipulation inputs of the manipulation panel 203.

Further, in a case in which the GPS reception unit 214 detects the position, the GPS reception unit 214 can detect the position by referring to the image from the camera unit 208. Further, it is possible to determine an optical axis direction of the camera unit 208 of the smartphone 200 or determine a current use environment by referring to the image from the camera unit 208 without using a triaxial acceleration sensor or in combination with the triaxial acceleration sensor. It is obvious that the image from the camera unit 208 can be used in application software.

In addition, the position information acquired by the GPS reception unit 214, the audio information acquired by the microphone 206 (which may be text information obtained through audio-text conversion in the main control unit or the like), the posture information acquired by the motion sensor unit 215, or the like may be added to the image data of the still image or the moving image and stored in the storage unit 212 or output via the external input and output unit 213 or the wireless communication unit 210.

In the above description, the imaging element 5 is the MOS type imaging element, but the same effect can be obtained even in a case where the imaging element 5 is a CCD type imaging element.

As described above, the following matters are disclosed in the present specification.

(1) An imaging device comprising: an imaging element including a sensor unit provided with a light reception surface on which a plurality of pixel rows including a plurality of pixels arranged in a row direction are arranged in a column direction orthogonal to the row direction, a storage unit that stores imaging signals read out from all the pixels included in the plurality of pixel rows, a first output terminal that outputs the imaging signal stored in the storage unit, and a second output terminal that outputs the imaging signal stored in the storage unit; an imaging control unit that performs a first imaging control of exposing the plurality of pixels, reading out imaging signals from the pixels, and storing the imaging signals in the storage unit; an output control unit that performs a first output control of outputting, among captured image signals composed of the imaging signals that are read out from the plurality of pixels and are stored in the storage unit by the first imaging control, the imaging signals read out from the pixels included in the pixel row that is selected in a case where the plurality of pixel rows are selected one for every N in the column direction, from the first output terminal, the N being a natural number of 2 or more, and a second output control of dividing the captured image signals into M groups including the imaging signals read out from the pixels in each division area that is obtained in a case where the light reception surface is divided in at least one of the row direction or the column direction, sequentially selecting the M groups, and outputting the imaging signals of the selected group from the second output terminal, the M being 2 or more; a first image processing unit that processes the imaging signals output from the first output terminal to generate captured image data for display; and a second image processing unit that processes the imaging signals of the group that are output from the second output terminal to sequentially generate divided image data corresponding to the group, and combines the divided image data corresponding to each of the M groups to generate captured image data for storage.

(2) The imaging device described in (1), further comprising: a priority level setting unit that sets a priority level for each of the M groups, in which the output control unit outputs the groups having the priority level equal to or higher than a priority threshold from the second output terminal prior to the group having the priority level less than the priority threshold.

(3) The imaging device described in (2), further comprising: a region-of-interest decision unit that decides a region of interest of an object being imaged on the basis of the imaging signals output from the first output terminal, in which the priority level setting unit sets the priority level equal to or higher than the priority threshold for the group read out from the pixel in the division area corresponding to the region of interest, among the M groups, and sets the priority level less than the priority threshold for the other groups.

(4) The imaging device described in (3), in which the region-of-interest decision unit performs a process of detecting a face region from the imaging signals output from the first output terminal and decides the face region as the region of interest.

(5) The imaging device described in (3), in which the imaging control unit performs at least once, a second imaging control of exposing the plurality of pixels, reading out imaging signals from the pixels, and storing the imaging signals in the storage unit, after the first imaging control, in which the output control unit further performs a third output control of outputting the imaging signals stored in the storage unit by the second imaging control, from the first output terminal after the output of the imaging signals by the first output control is completed, and in which the region-of-interest decision unit performs a process of detecting a moving body region included in the object on the basis of the plurality of imaging signals consecutively output from the first output terminal and decides the moving body region as the region of interest.

(6) The imaging device described in (2), in which the priority level setting unit sets the priority level equal to or higher than the priority threshold for the group, which is read out from the pixel in the division area overlapping a focus area selected from among a plurality of focus areas that are set on the light reception surface and are to be focused, among the M groups, and sets the priority level less than the priority threshold for the other groups.

(7) The imaging device described in any one of (1) to (6), in which the N and the M are the same value.

(8) The imaging device described in any one of (1) to (7), in which in a case where a temperature inside the imaging device is equal to or higher than a temperature threshold or in a case where a battery remaining capacity of the imaging device is equal to or less than a remaining capacity threshold, the output control unit stops the second output control, and outputs, from the second output terminal, imaging signals except the imaging signals output from the first output terminal by the first output control among the captured image signals.

(9) The imaging device described in (8), in which in a case where the second output control is stopped, the output control unit outputs, from the second output terminal, the imaging signals except the imaging signals output from the first output terminal by the first output control by a plurality of times, and sets an output speed of the imaging signal from the second output terminal to be lower than an output speed of the imaging signal from the first output terminal by the first output control.

(10) The imaging device described in any one of (1) to (7), in which the output control unit sets an output speed of the group output from the second output terminal by the second output control to be lower in a case where a temperature inside the imaging device is equal to or higher than a temperature threshold or in a case where a battery remaining capacity of the imaging device is equal to or less than a remaining capacity threshold, than that in a case where the temperature inside the imaging device is less than the temperature threshold or in a case where the battery remaining capacity is greater than the remaining capacity threshold.

(11) The imaging device described in any one of (1) to (10), in which the selected pixel row includes a phase difference detection pixel.

(12) The imaging device described in any one of (1) to (11), in which the division area is obtained by the light reception surface being divided in the row direction.

(13) The imaging device described in any one of (1) to (11), in which the division area is obtained by the light reception surface being divided in the column direction.

(14) An imaging method of imaging an object by using an imaging element including a sensor unit provided with a light reception surface on which a plurality of pixel rows including a plurality of pixels arranged in a row direction are arranged in a column direction orthogonal to the row direction, a storage unit that stores imaging signals read out from all the pixels included in the plurality of pixel rows, a first output terminal that outputs the imaging signal stored in the storage unit, and a second output terminal that outputs the imaging signal stored in the storage unit, the imaging method comprising: an imaging control step of performing a first imaging control of exposing the plurality of pixels, reading out imaging signals from the pixels, and storing the imaging signals in the storage unit; an output control step of performing a first output control of outputting, among captured image signals composed of the imaging signals that are read out from the plurality of pixels and are stored in the storage unit by the first imaging control, the imaging signals read out from the pixels included in the pixel row that is selected in a case where the plurality of pixel rows are selected one for every N in the column direction, from the first output terminal, the N being a natural number of 2 or more, and a second output control of dividing the captured image signals into M groups including the imaging signals read out from the pixels in each division area that is obtained in a case where the light reception surface is divided in at least one of the row direction or the column direction, sequentially selecting the M groups, and outputting the imaging signals of the selected group from the second output terminal, the M being 2 or more; a first image processing step of processing the imaging signals output from the first output terminal to generate captured image data for display; and a second image processing step of sequentially processing the imaging signals of the group that are output from the second output terminal to generate divided image data corresponding to the group, and combining the divided image data corresponding to each of the M groups to generate captured image data for storage.

(15) The imaging method described in (14), further comprising: a priority level setting step of setting a priority level for each of the M groups, in which the output control step includes outputting the groups having the priority level equal to or higher than a priority threshold from the second output terminal prior to the group having the priority level less than the priority threshold.

(16) The imaging method described in (15), further comprising: a region-of-interest decision step of deciding a region of interest of an object being imaged on the basis of the imaging signals output from the first output terminal, in which the priority level setting step includes setting the priority level equal to or higher than the priority threshold for the group read out from the pixel in the division area corresponding to the region of interest, among the M groups, and setting the priority level less than the priority threshold for the other groups.

(17) The imaging method described in (16), in which the region-of-interest decision step includes performing a process of detecting a face region from the imaging signals output from the first output terminal and deciding the face region as the region of interest.

(18) The imaging method described in (16), in which the imaging control step includes performing at least once, a second imaging control of exposing the plurality of pixels, reading out imaging signals from the pixels, and storing the imaging signals in the storage unit, after the first imaging control, in which the output control step further includes performing a third output control of outputting the imaging signals stored in the storage unit by the second imaging control, from the first output terminal after the output of the imaging signals by the first output control is completed, and in which the region-of-interest decision step includes performing a process of detecting a moving body region included in the object on the basis of the plurality of imaging signals consecutively output from the first output terminal and deciding the moving body region as the region of interest.

(19) The imaging method described in (15), in which the priority level setting step includes setting the priority level equal to or higher than the priority threshold for the group, which is read out from the pixel in the division area overlapping a focus area selected from among a plurality of focus areas that are set on the light reception surface and are to be focused, among the M groups, and setting the priority level less than the priority threshold for the other groups.

(20) The imaging method described in any one of (14) to (19), in which the N and the M are the same value.

(21) The imaging method described in any one of (14) to (20), in which in a case where a temperature inside an imaging device in which the imaging element is mounted is equal to or higher than a temperature threshold or in a case where a battery remaining capacity of the imaging device is equal to or less than a remaining capacity threshold, the output control step includes stopping the second output control, and outputting, from the second output terminal, imaging signals except the imaging signals output from the first output terminal by the first output control among the captured image signals.

(22) The imaging method described in (21), in which in a case where the second output control is stopped, the output control step includes outputting, from the second output terminal, the imaging signals except the imaging signals output from the first output terminal by the first output control by a plurality of times, and setting an output speed of the imaging signal from the second output terminal to be lower than an output speed of the imaging signal from the first output terminal by the first output control.

(23) The imaging method described in any one of (14) to (20), in which the output control step includes setting an output speed of the group output from the second output terminal by the second output control to be lower in a case where a temperature inside an imaging device in which the imaging element is mounted is equal to or higher than a temperature threshold or in a case where a battery remaining capacity of the imaging device is equal to or less than a remaining capacity threshold, than that in a case where the temperature inside the imaging device is less than the temperature threshold or in a case where the battery remaining capacity is greater than the remaining capacity threshold.

(24) The imaging method described in any one of (14) to (23), in which the selected pixel row includes a phase difference detection pixel.

(25) The imaging method described in any one of (14) to (24), in which the division area is obtained by the light reception surface being divided in the row direction.

(26) The imaging method described in any one of (14) to (24), in which the division area is obtained by the light reception surface being divided in the column direction.

(27) An imaging program for imaging an object by using an imaging element including a sensor unit provided with a light reception surface on which a plurality of pixel rows including a plurality of pixels arranged in a row direction are arranged in a column direction orthogonal to the row direction, a storage unit that stores imaging signals read out from all the pixels included in the plurality of pixel rows, a first output terminal that outputs the imaging signal stored in the storage unit, and a second output terminal that outputs the imaging signal stored in the storage unit, the imaging program causing a computer to execute: an imaging control step of performing a first imaging control of exposing the plurality of pixels, reading out imaging signals from the pixels, and storing the imaging signals in the storage unit; an output control step of performing a first output control of outputting, among captured image signals composed of the imaging signals that are read out from the plurality of pixels and are stored in the storage unit by the first imaging control, the imaging signals read out from the pixels included in the pixel row that is selected in a case where the plurality of pixel rows are selected one for every N in the column direction, from the first output terminal, the N being a natural number of 2 or more, and a second output control of dividing the captured image signals into M groups including the imaging signals read out from the pixels in each division area that is obtained in a case where the light reception surface is divided in at least one of the row direction or the column direction, sequentially selecting the M groups, and outputting the imaging signals of the selected group from the second output terminal, the M being 2 or more; a first image processing step of processing the imaging signals output from the first output terminal to generate captured image data for display; and a second image processing step of sequentially processing the imaging signals of the group that are output from the second output terminal to generate divided image data corresponding to the group, and combining the divided image data corresponding to each of the M groups to generate captured image data for storage.

According to the present invention, it is possible to reduce the time from the imaging for storage to the completion of generation of captured image data for storage, and to quickly check the captured image data for storage after the imaging.

Although the present invention has been described with reference to specific embodiments, the present invention is not limited to the embodiments, and various modifications are possible without departing from the technical spirit of the disclosed invention.

This application is based on Japanese patent application (Japanese Patent Application No. 2016-221762) filed Nov. 14, 2016, the content of which is incorporated herein.

EXPLANATION OF REFERENCES 100, 100A: digital camera
1: imaging lens
2: aperture
4: lens control unit
5: imaging element
8: lens driving unit
9: aperture driving unit
10: sensor driving unit
11: system control unit
11A: imaging control unit
11B: output control unit
11C: region-of-interest decision unit
11D: priority level setting unit
14: manipulation unit
17: digital signal processing unit
17A: first image processing unit
17B: second image processing unit
20: external memory control unit
21: storage medium
22: display driver
23: display unit
24: control bus
25: data bus
40: lens device
51: sensor unit
52: storage unit
60: light reception surface
61: pixel
62: pixel row
63: driving circuit
64: signal processing circuit
70: temperature sensor
71: battery capacity sensor
X: row direction
Y: column direction
F1 to F4: field
P: period during which imaging control for still image storage is performed
L: period during which imaging control for live view is performed
RS: straight line indicating reset timing
RO: straight line indicating reading timing of imaging signal
Pf1 to Pf4, Lf1: straight line indicating output timing of signal from first output terminal CH0
GA, GB, GC, GD: straight line indicating output timing of signal from second output terminal CH1

200: smartphone
201: casing
202: display panel
203: manipulation panel
204: display input unit
205: speaker
206: microphone
207: manipulation unit
208: camera unit
210: wireless communication unit
211: call unit
212: storage unit
213: external input and output unit
214: GPS reception unit
215: motion sensor unit
216: power supply unit
217: internal storage unit
218: external storage unit
220: main control unit
ST1 to STn: GPS satellite

What is claimed is:

1. An imaging device comprising:
an imaging element comprising
a sensor unit provided with a light reception surface on which a plurality of pixel rows including a plurality of pixels arranged in a row direction are arranged in a column direction orthogonal to the row direction,
a storage unit that stores imaging signals read out from all of the pixels included in the plurality of pixel rows,
a first output terminal that outputs the imaging signal stored in the storage unit, and
a second output terminal that outputs the imaging signal stored in the storage unit;
an imaging control unit that performs a first imaging control of exposing the plurality of pixels, reading out imaging signals from the pixels, and storing the imaging signals in the storage unit;
an output control unit that performs
a first output control of outputting, among captured image signals composed of the imaging signals that are read out from the plurality of pixels and are stored in the storage unit by the first imaging control, the imaging signals read out from the pixels included in the pixel row that is selected in a case where the plurality of pixel rows are selected one for every N in the column direction, from the first output terminal, the N being a natural number of 2 or more, and
a second output control of dividing the captured image signals into M groups including the imaging signals read out from the pixels in each of M division areas that are obtained in a case where the light reception surface is divided into the M division areas in at least one of the row direction or the column direction, sequentially selecting the M groups, and outputting the imaging signals of the selected group from the second output terminal, the M being 2 or more;
a first image processing unit that processes the imaging signals output from the first output terminal to generate captured image data for display; and
a second image processing unit that processes the imaging signals of the group that are output from the second output terminal to sequentially generate divided image data corresponding to the group, and combines the divided image data corresponding to each of the M groups to generate captured image data for storage.

2. The imaging device according to claim 1, further comprising:
a priority level setting unit that sets a priority level for each of the M groups,
wherein the output control unit outputs the groups having the priority level equal to or higher than a priority threshold from the second output terminal prior to the group having the priority level less than the priority threshold.

3. The imaging device according to claim 2, further comprising:
a region-of-interest decision unit that decides a region of interest of an object being imaged based on the imaging signals output from the first output terminal,
wherein the priority level setting unit sets the priority level equal to or higher than the priority threshold for the group read out from the pixel in the division area corresponding to the region of interest, among the M groups, and sets the priority level less than the priority threshold for other of the groups.

4. The imaging device according to claim 3,
wherein the region-of-interest decision unit performs a process of detecting a face region from the imaging signals output from the first output terminal and decides the face region as the region of interest.

5. The imaging device according to claim 3,
wherein the imaging control unit performs at least once, a second imaging control of exposing the plurality of pixels, reading out imaging signals from the pixels, and storing the imaging signals in the storage unit, after the first imaging control,
wherein the output control unit further performs a third output control of outputting the imaging signals stored in the storage unit by the second imaging control, from the first output terminal after the output of the imaging signals by the first output control is completed, and
wherein the region-of-interest decision unit performs a process of detecting a moving body region included in the object based on the plurality of imaging signals consecutively output from the first output terminal and decides the moving body region as the region of interest.

6. The imaging device according to claim 2,
wherein the priority level setting unit sets the priority level equal to or higher than the priority threshold for the group, which is read out from the pixel in the division area overlapping a focus area selected from among a plurality of focus areas that are set on the light reception surface and are to be focused, among the M groups, and sets the priority level less than the priority threshold for other of the groups.

7. The imaging device according to claim 1,
wherein the N and the M are same value.

8. The imaging device according to claim 1,
wherein in a case where a temperature inside the imaging device is equal to or higher than a temperature threshold or in a case where a battery remaining capacity of the imaging device is equal to or less than a remaining capacity threshold, the output control unit stops the second output control, and outputs, from the second output terminal, imaging signals except the imaging signals output from the first output terminal by the first output control among the captured image signals.

9. The imaging device according to claim 8,
wherein in a case where the second output control is stopped, the output control unit outputs, from the second output terminal, the imaging signals except the imaging signals output from the first output terminal by the first output control by a plurality of times, and sets an output speed of the imaging signal from the second output terminal to be lower than an output speed of the imaging signal from the first output terminal by the first output control.

10. The imaging device according to claim 1, wherein the output control unit sets an output speed of the group output from the second output terminal by the second output control to be lower in a case where a temperature inside the imaging device is equal to or higher than a temperature threshold or in a case where a battery remaining capacity of the imaging device is equal to or less than a remaining capacity threshold, than that in a case where the temperature inside the imaging device is less than the temperature threshold or in a case where the battery remaining capacity is greater than the remaining capacity threshold.

11. The imaging device according to claim 1, wherein the selected pixel row includes a phase difference detection pixel.

12. The imaging device according to claim 1, wherein the division area is obtained by the light reception surface being divided in the row direction.

13. The imaging device according to claim 1, wherein the division area is obtained by the light reception surface being divided in the column direction.

14. An imaging method of imaging an object by using an imaging element including a sensor unit provided with a light reception surface on which a plurality of pixel rows including a plurality of pixels arranged in a row direction are arranged in a column direction orthogonal to the row direction, a storage unit that stores imaging signals read out from all of the pixels included in the plurality of pixel rows, a first output terminal that outputs the imaging signal stored in the storage unit, and a second output terminal that outputs the imaging signal stored in the storage unit, the imaging method comprising:
  an imaging control step of performing a first imaging control of exposing the plurality of pixels, reading out imaging signals from the pixels, and storing the imaging signals in the storage unit;
  an output control step of performing
    a first output control of outputting, among captured image signals composed of the imaging signals that are read out from the plurality of pixels and are stored in the storage unit by the first imaging control, the imaging signals read out from the pixels included in the pixel row that is selected in a case where the plurality of pixel rows are selected one for every N in the column direction, from the first output terminal, the N being a natural number of 2 or more, and
    a second output control of dividing the captured image signals into M groups including the imaging signals read out from the pixels in each of M division areas that are obtained in a case where the light reception surface is divided into the M division areas in at least one of the row direction or the column direction, sequentially selecting the M groups, and outputting the imaging signals of the selected group from the second output terminal, the M being 2 or more;
  a first image processing step of processing the imaging signals output from the first output terminal to generate captured image data for display; and
  a second image processing step of sequentially processing the imaging signals of the group that are output from the second output terminal to generate divided image data corresponding to the group, and combining the divided image data corresponding to each of the M groups to generate captured image data for storage.

15. The imaging method according to claim 14, further comprising:
  a priority level setting step of setting a priority level for each of the M groups,
  wherein the output control step includes outputting the groups having the priority level equal to or higher than a priority threshold from the second output terminal prior to the group having the priority level less than the priority threshold.

16. The imaging method according to claim 15, further comprising:
  a region-of-interest decision step of deciding a region of interest of an object being imaged based on the imaging signals output from the first output terminal,
  wherein the priority level setting step includes setting the priority level equal to or higher than the priority threshold for the group read out from the pixel in the division area corresponding to the region of interest, among the M groups, and setting the priority level less than the priority threshold for other of the groups.

17. The imaging method according to claim 16, wherein the region-of-interest decision step includes performing a process of detecting a face region from the imaging signals output from the first output terminal and deciding the face region as the region of interest.

18. The imaging method according to claim 16, wherein the imaging control step includes performing at least once, a second imaging control of exposing the plurality of pixels, reading out imaging signals from the pixels, and storing the imaging signals in the storage unit, after the first imaging control,
  wherein the output control step further includes performing a third output control of outputting the imaging signals stored in the storage unit by the second imaging control, from the first output terminal after the output of the imaging signals by the first output control is completed, and
  wherein the region-of-interest decision step includes performing a process of detecting a moving body region included in the object based on the plurality of imaging signals consecutively output from the first output terminal and deciding the moving body region as the region of interest.

19. The imaging method according to claim 15, wherein the priority level setting step includes setting the priority level equal to or higher than the priority threshold for the group, which is read out from the pixel in the division area overlapping a focus area selected from among a plurality of focus areas that are set on the light reception surface and are to be focused, among the M groups, and setting the priority level less than the priority threshold for other of the groups.

20. The imaging method according to claim 14, wherein the N and the M are same value.

21. The imaging method according to claim 14, wherein in a case where a temperature inside an imaging device in which the imaging element is mounted is equal to or higher than a temperature threshold or in a case where a battery remaining capacity of the imaging device is equal to or less than a remaining capacity threshold, the output control step includes stopping the second output control, and outputting, from the second output terminal, imaging signals except the imaging signals output from the first output terminal by the first output control among the captured image signals.

22. The imaging method according to claim 21,
wherein in a case where the second output control is stopped, the output control step includes outputting, from the second output terminal, the imaging signals except the imaging signals output from the first output terminal by the first output control by a plurality of times, and setting an output speed of the imaging signal from the second output terminal to be lower than an output speed of the imaging signal from the first output terminal by the first output control.

23. The imaging method according to claim 14,
wherein the output control step includes setting an output speed of the group output from the second output terminal by the second output control to be lower in a case where a temperature inside an imaging device in which the imaging element is mounted is equal to or higher than a temperature threshold or in a case where a battery remaining capacity of the imaging device is equal to or less than a remaining capacity threshold, than that in a case where the temperature inside the imaging device is less than the temperature threshold or in a case where the battery remaining capacity is greater than the remaining capacity threshold.

24. The imaging method according to claim 14,
wherein the selected pixel row includes a phase difference detection pixel.

25. The imaging method according to claim 14,
wherein the division area is obtained by the light reception surface being divided in the row direction.

26. The imaging method according to claim 14,
wherein the division area is obtained by the light reception surface being divided in the column direction.

27. A non-transitory computer readable medium storing an imaging program for imaging an object by using an imaging element including a sensor unit provided with a light reception surface on which a plurality of pixel rows including a plurality of pixels arranged in a row direction are arranged in a column direction orthogonal to the row direction, a storage unit that stores imaging signals read out from all of the pixels included in the plurality of pixel rows, a first output terminal that outputs the imaging signal stored in the storage unit, and a second output terminal that outputs the imaging signal stored in the storage unit, the imaging program causing a computer to execute:

an imaging control step of performing a first imaging control of exposing the plurality of pixels, reading out imaging signals from the pixels, and storing the imaging signals in the storage unit;

an output control step of performing a first output control of outputting, among captured image signals composed of the imaging signals that are read out from the plurality of pixels and are stored in the storage unit by the first imaging control, the imaging signals read out from the pixels included in the pixel row that is selected in a case where the plurality of pixel rows are selected one for every N in the column direction, from the first output terminal, the N being a natural number of 2 or more, and a second output control of dividing the captured image signals into M groups including the imaging signals read out from the pixels in each of M division areas that are obtained in a case where the light reception surface is divided into the M division areas in at least one of the row direction or the column direction, sequentially selecting the M groups, and outputting the imaging signals of the selected group from the second output terminal, the M being 2 or more;

a first image processing step of processing the imaging signals output from the first output terminal to generate captured image data for display; and a second image processing step of sequentially processing the imaging signals of the group that are output from the second output terminal to generate divided image data corresponding to the group, and combining the divided image data corresponding to each of the M groups to generate captured image data for storage.

* * * * *